(12) United States Patent
May et al.

(10) Patent No.: US 7,614,750 B2
(45) Date of Patent: Nov. 10, 2009

(54) LIGHT INTERACTION STATES

(75) Inventors: Gregory H. May, Corvallis, OR (US);
Daryl E. Anderson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 538 days.

(21) Appl. No.: 11/210,391

(22) Filed: Aug. 24, 2005

(65) Prior Publication Data
US 2007/0052638 A1    Mar. 8, 2007

(51) Int. Cl.
G03B 21/26 (2006.01)
G03B 21/20 (2006.01)
G03B 21/60 (2006.01)

(52) U.S. Cl. ............... 353/29; 353/85; 359/452; 359/459

(58) Field of Classification Search ............... 353/85, 353/122, 29; 359/443, 452, 454, 455, 459
See application file for complete search history.

(56) References Cited

U.S. PATENT DOCUMENTS

| | | | |
|---|---|---|---|
| 5,075,789 A | 12/1991 | Jones et al. | |
| 5,175,637 A | 12/1992 | Jones et al. | |
| 5,389,945 A | 2/1995 | Sheridon | |
| 5,416,617 A | 5/1995 | Loiseaux et al. | |
| 5,625,489 A * | 4/1997 | Glenn | 359/455 |
| 5,922,268 A | 7/1999 | Sheridon | |
| 6,054,071 A | 4/2000 | Mikkelsen, Jr. | |
| 6,426,836 B2 | 7/2002 | Dorsel et al. | |
| 6,497,942 B2 * | 12/2002 | Sheridon et al. | 428/195.1 |
| 6,538,814 B2 | 3/2003 | Hunter et al. | |
| 6,690,350 B2 | 2/2004 | Sheridon | |
| 6,846,377 B2 | 1/2005 | Biegelsen et al. | |
| 6,853,486 B2 | 2/2005 | Cruz-Uribe et al. | |
| 6,897,848 B2 | 5/2005 | Sheridon | |
| 2004/0012849 A1 | 1/2004 | Cruz-Uribe et al. | |
| 2005/0057803 A1 | 3/2005 | Cruz-Uribe et al. | |
| 2006/0020469 A1 * | 1/2006 | Rast | 704/270 |

* cited by examiner

Primary Examiner—Rochelle-Ann J Blackman

(57) ABSTRACT

Various embodiments of moving between light interaction states are disclosed.

25 Claims, 9 Drawing Sheets

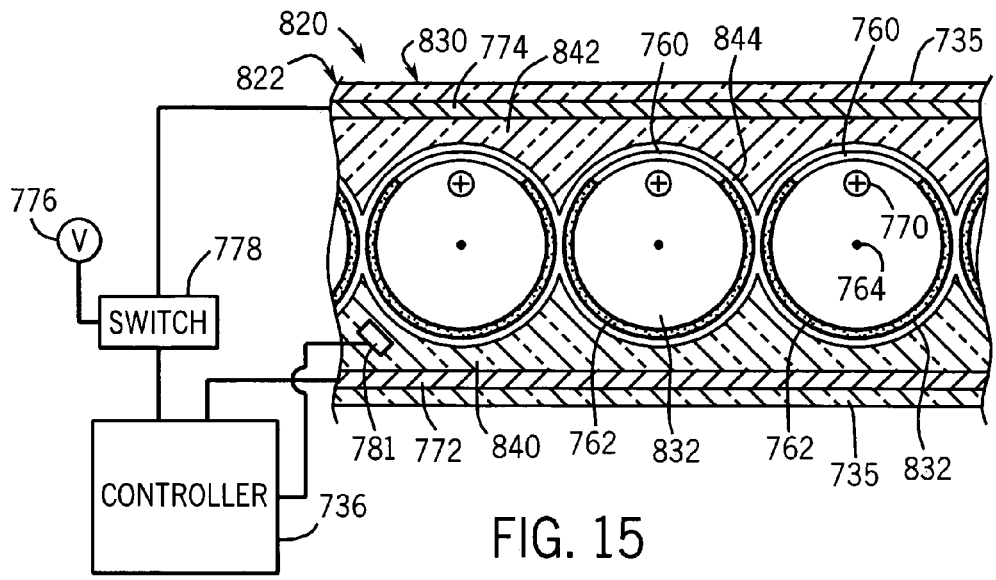
FIG. 15
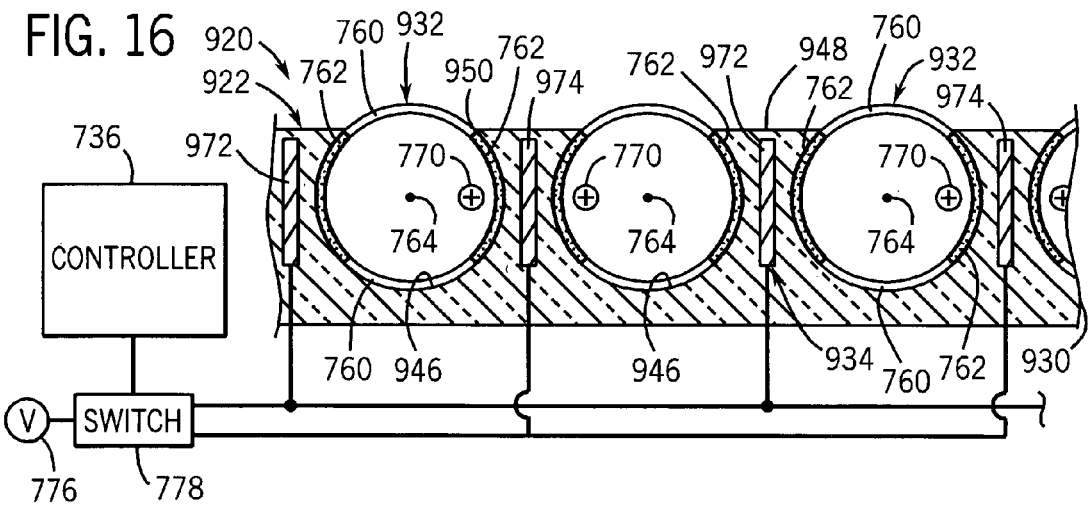
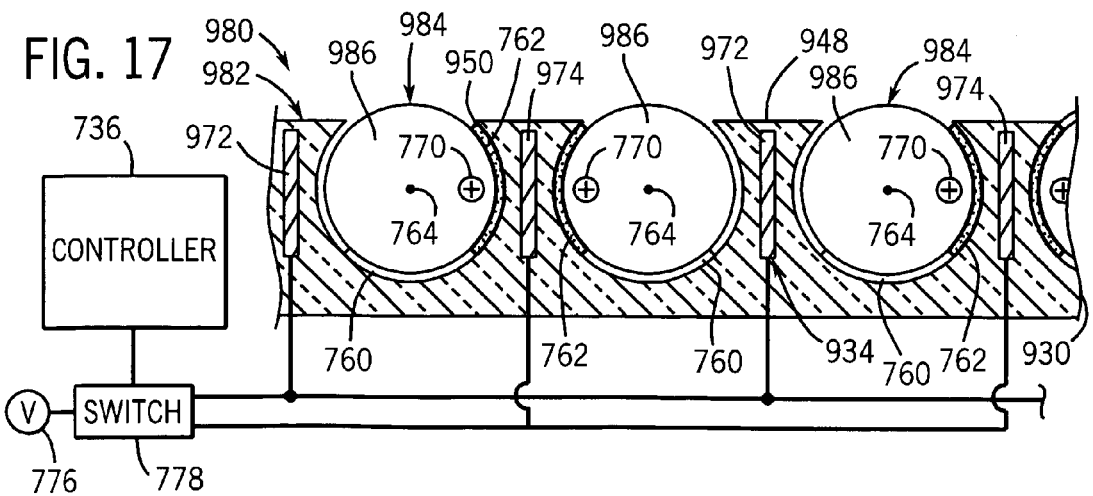

LIGHT INTERACTION STATES

BACKGROUND

Display Systems may interact with light by reflecting such light or by transmitting such light. Such systems may lack the capability to effectively switch between different reflectivity or different transmissivity states.

BRIEF DESCRIPTION OF THE DRAWINGS

FIG. 15 is an enlarged fragmentary sectional view of another embodiment of a screen of the display system of FIG. 7 according to an example embodiment.

FIG. 16 is an enlarged fragmentary sectional view of another embodiment of a screen of the display system of FIG. 7 according to an example embodiment.

FIG. 17 is an enlarged fragmentary sectional view of another embodiment of a screen of the display system of FIG. 7 according to an example embodiment.

DETAILED DESCRIPTION OF EXAMPLE EMBODIMENTS

Figure 1:
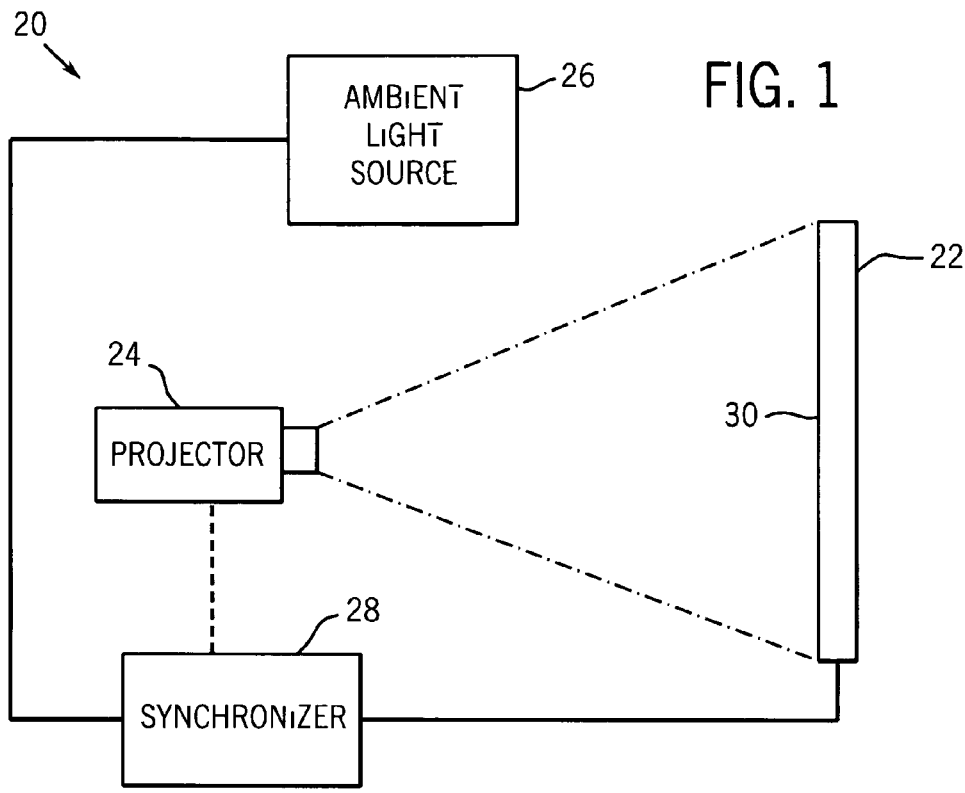
FIG. 1 schematically illustrates an embodiment of a display system according to one example embodiment.

FIG. 1 schematically illustrates display system 20 configured to display images in the presence of ambient light. Display system 20 generally includes screen 22, projector 24, ambient light source 26 and synchronizer 28. Screen 22 constitutes a structure having a surface 30 configured to rapidly change, such as flicker, between different reflective states. In one embodiment, surface 30 of screen 22 is configured to flicker between a first reflective state in which a substantial portion, perhaps substantially all the visual light is reflected and a second reflective state in which a majority of visual light is absorbed. According to one embodiment, surface 30 of screen 22 flickers between a white reflective state and a second black absorbing state in which a substantial percentage of visual light is absorbed. In other embodiments, surface 30 of screen 22 flickers between a first reflective state and a second less reflective state, wherein different levels of electromagnetic radiation, such as infrared light or ultraviolet light are reflected or absorbed.

Projector 24 constitutes a device configured to project visual light towards surface 30 of screen 22 such that the incident light is reflected from surface 30 and is viewable by an observer. In one embodiment, projector 24 is configured to project color images at screen 22. In one embodiment, projector 24 may constitute a digital light processing (DLP) projector. In other embodiments, projector 24 may constitute a 35 millimeter projector, an overhead projector or other devices configured to project images of light upon screen 22. In other embodiments, projector 24 may be configured to project other wavelengths of electromagnetic radiation such as infrared light or ultraviolet light and the like.

Ambient light source 26 constitutes a source of ambient light for the environment of projector 24 and screen 22. Ambient light source 26 is configured to rapidly change, such as flicker, between different states of intensity or brightness in which the environment of screen 22 is lit to different light intensities. Ambient light source 26 flickers between the different brightness levels or states at a frequency greater than or equal to a flicker fusion frequency of observers (i.e., a lowest frequency at which the flickering of light intensity is not noticeable to a human eye). In one embodiment, ambient light source 26 flickers between a lighting state and a dark state. In one embodiment, ambient light source 26 may constitute one or more devices configured to generate and emit pulses of light at differing intensity levels. In one embodiment, ambient light source 26 flickers between a first greater bright state having a peak intensity and a lesser bright state having a low point or level intensity which is less than or equal to 70% of the peak intensity. In one particular embodiment, ambient light source 26 flickers between the bright state having a peak intensity and the lesser bright state having a low point or level intensity which is less than or equal to 50% of the peak intensity. In still other embodiments, the lesser bright state is at a level less than or equal to 25% of the peak intensity of the bright state.

Examples of such ambient light sources include solid state emitters such as light emitting diodes and pulsed gas discharge lamps. In other embodiments, ambient light source 26 may constitute generally continuous light sources such as continuous incandescent lamps that are additionally provided with a mechanical or electrical shutter such that pulses of light are emitted or continuous sources of light with electro optical shutters such as those employing liquid crystals and the like. In still other embodiments, ambient light source 26 may constitute a window having a variable translucency such that pulses of light with different intensity and pulses at a frequency greater than or equal to the flicker fusion frequency of observers are permitted to pass through the window. For example, in one embodiment, ambient light source 26 may constitute a window that can change between a first translucency and a second lesser translucency in which light is blocked and wherein the changing of the window between the two states occurs at a frequency greater than or equal to the flicker fusion frequency of observers. In other embodiments, ambient light source 26 may constitute other such devices.

According to one embodiment, ambient light source 26 constitutes a single source of ambient light which flickers between different brightness levels or states at a frequency greater than or equal to a flicker fusion frequency of observers. In another embodiment, ambient light source 26 may constitute multiple sources of ambient light which are synchronized and in phase with one another, wherein all such sources flicker at a common frequency or multiples of a common frequency greater than or equal to a flicker fusion frequency of an observer. In still another embodiment, ambient light source 26 may constitute multiple sources of ambient light which flicker at the same frequency or frequencies that are multiples of one another, but which are out of phase. For example, in one embodiment, ambient light source 26 may include a first light source flickering at 30 Hertz and another ambient light source flickering at 30 Hertz but 180 degrees out of phase with the first ambient light source. If coverage is sufficient, it may appear to an observer that the lights are running at 60 Hertz in phase on the resulting lit surfaces.

Synchronizer 28 constitutes one or more devices configured to synchronize or otherwise appropriately time the flickering of screen 22 and ambient light source 26. In some embodiments, as shown in FIG. 1, synchronizer 28 is also configured to synchronize flickering of projector 24 with that of screen 22 and ambient light source 26 or control the timing of the flicker to occur during the blanking segments of the projected image or color wheel spokes.

Figure 2:
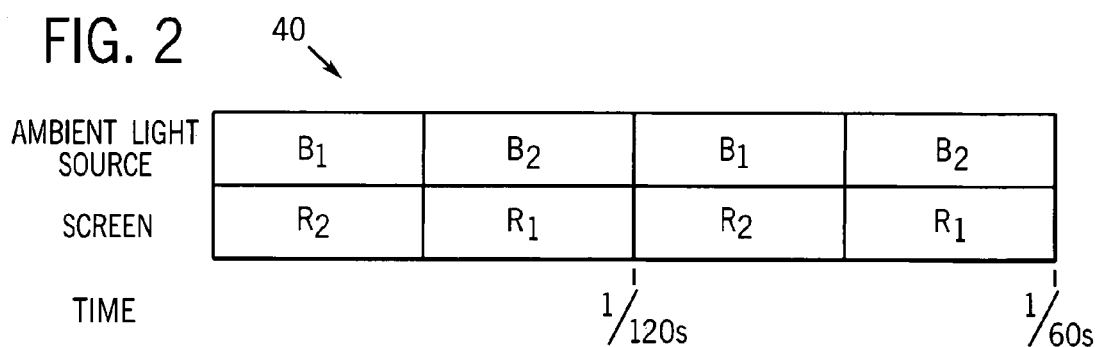
FIG. 2 illustrates one example embodiment of a synchronization timing sequence that may be employed by the display system of FIG. 1 according to one example embodiment.

Synchronizer 28 synchronizes the flickering of screen 22 and ambient light source 26 such that screen 22 has a greater reflectivity when ambient light source 26 has a lower brightness and such that screen 22 has a lesser reflectivity when ambient light source 26 has a greater brightness. FIG. 2 schematically illustrates one example of a synchronization timing sequence 40 that may be implemented by synchronizer 28. In the timing sequence shown in FIG. 2, ambient light source 26 flickers or modulates between a first greater brightness state $B_1$ and a second lesser brightness state $B_2$. Screen 22 flickers or modulates between a first greater reflectivity state $R_1$ and a second lesser reflectivity state $R_2$. In one embodiment, the second lesser brightness state $B_2$ may be the transmission or emission of no visual light. In other embodiments, the second lesser brightness state $B_2$ may constitute the transmission or emission of some light but at a lower intensity as compared to the first brightness state $B_1$. In one embodiment, the second lesser reflectivity state $R_2$ may result in the complete or substantially complete absorption of all light, such as when screen 22 is black. In other embodiments, the second lesser reflectivity state $R_2$ may result in the reflection of some light, but less light as compared to the first greater reflectivity state $R_1$. In one embodiment, the first greater reflectivity state $R_1$ may result in reflection of substantially all visual light such as with a white screen. In other embodiments, the first greater reflectivity state $R_1$ may result in the reflection of some light, but not substantially all light, but more light as compared to the second lower reflectivity state $R_2$. In other embodiments, the first greater reflectivity state $R_1$ may result in the reflection of some particular wavelengths of light and the absorption of other particular wavelengths of light.

As shown by FIG. 2, synchronizer 28 flickers or modulates ambient light source 26 and screen 22 such that ambient light source 26 is in the first greater brightness state $B_1$ while screen 22 is in the second lesser reflectivity state $R_2$. Synchronizer 28 further flickers or modulates ambient light source 26 and screen 22 such that ambient light source 26 is in the second lesser brightness state $B_2$ while screen 22 is in the first greater reflectivity state $R_1$. As a result, when ambient light source is in the second greater brightness state $B_1$, screen 22 absorbs a greater percentage of such light and when ambient light source 26 is in the second lesser brightness state $B_2$, screen 22 reflects a greater percentage of light projected by projector 24. Consequently, the ambient lighting level and the environment of screen 22 may be maintained while the contrast of the image projected onto screen 22 by projector 24, is greater than it would otherwise be. In other words, contrast is substantially maintained in the presence of ambient light.

As further shown by the example synchronization timing sequence 40 in FIG. 2, ambient light source 26 is modulated such that ambient light source 26 is in the first greater brightness state $B_1$ for a time substantially equal to the time ambient light source 26 is in the second lesser brightness state $B_2$. Likewise, the time screen 22 is in the first greater reflectivity state $R_1$ is substantially equal to the time screen 22 is in the second lesser reflectivity state $R_2$. As shown by FIG. 2, both ambient light source 26 and screen 22 modulate between the brightness states and the reflectivity states at frequencies of 120 cycles per second. Because such modulation is greater than a flicker fusion frequency of the human eye (typically 50 cycles per second or 50 Hertz), an unaided human eye is generally not able to detect such flickering. In other words, light emitted or transmitted by the ambient light source appears to be constant while screen 22 also appears to be in a constant state of reflectivity. Although the timing sequence in FIG. 2 illustrates a modulation frequency of 120 Hertz for both ambient light source 26 and screen 22, in other embodiments, the modulation frequency may be greater or smaller while being greater than or equal to the flicker fusion frequency of a human eye.

Figure 3:
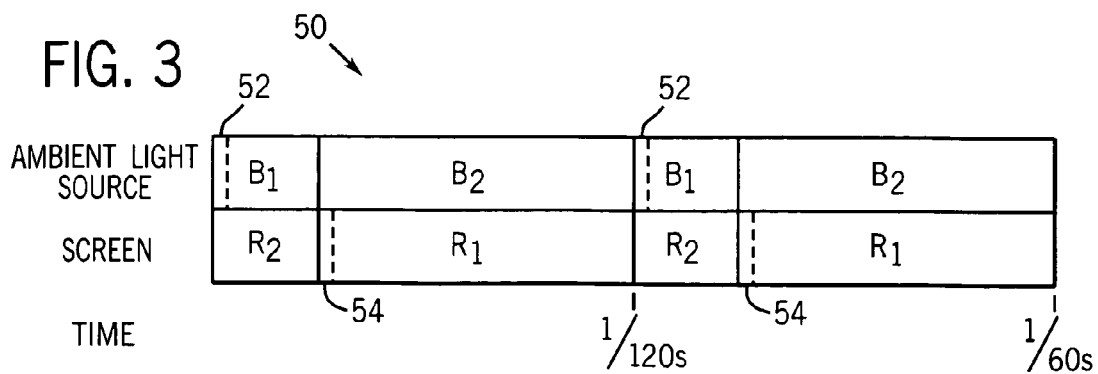
FIG. 3 illustrates another example embodiment of a synchronization timing sequence that may be employed by the display system of FIG. 1 according to one example embodiment.

FIG. 3 illustrates another example of a synchronization timing sequence 50 that may be employed by synchronizers 28 (shown in FIG. 1). Timing sequence 50 is similar to timing sequence 40 except that ambient light source 26 is in the second lesser brightness state $B_2$ a greater percentage of the time as compared to the first greater brightness state $B_1$.

Screen 22 is in the first greater reflectivity state $R_1$ a greater percentage of time as compared to the second lesser reflectivity state $R_2$. Because screen 22 is in the first greater reflectivity state $R_1$ for a greater percentage of time as compared to the second lesser reflectivity state $R_2$ and because ambient light source 26 is in the second lesser brightness state $B_2$ a greater percentage of time as compared to the first greater brightness state $B_1$, more light from projector 24 is reflected by screen 22 and less ambient light is reflected off of screen 22. As a result, the image reflected off of screen 22 and viewed by an observer has enhanced contrast and greater brightness as compared to that resulting from the timing sequence shown in FIG. 2.

According to one embodiment of the timing sequence shown in FIG. 3, ambient light source 26 is in the second lesser brightness state $B_2$ and screen 22 is in the first greater reflective state $R_1$ greater than or equal to 75 percent of the time which provides enhanced contrast while not substantially reducing screen image brightness. In other embodiments, the percentage at which light source 26 is in the second lesser brightness state and in which screen 22 is in the first reflectivity state $R_1$ may be reduced or enlarged.

FIG. 3 further illustrates a variation upon synchronization timing sequence 50. In particular embodiments, screen 22 may transition between the first greater reflectivity state $R_1$ and the second lesser reflectivity state $R_2$ slower than the rate at which ambient light source 26 is able to transition from the lesser bright state $B_2$ to the greater bright state $B_1$. If screen 22 is not in a sufficiently light absorbing state when ambient light source 26 completes its transition to the first greater bright state $B_1$, an excessive amount of ambient light may be unintentionally reflected off of screen 22, potentially reducing image quality. As shown by FIG. 3, timing sequence 50 may be slightly modified to include guard bands 52 (illustrated by dashed lines succeeding the previous time at which ambient light source 26 was to transition to the greater bright state $B_1$). Guard bands 52 constitute periods of time that elapse after screen 22 is to complete its transition to the second lesser reflectivity state $R_2$ before ambient light source begins its transition to the greater bright state $B_1$. In other words, guard bands 52 provide tolerance to sequence 50 to accommodate potentially slower response times of screen 22. Such guard bands 52 may also be employed in sequence 40 shown in FIG. 2, in sequence 60 shown and described with respect to FIG. 4 or in other synchronization timing sequences between ambient light source 26 and screen 22.

FIG. 3 also illustrates a reverse scenario in which ambient light source 26 transitions between the first greater bright state $B_1$ and the second lesser bright state $B_2$ is slower than the rate at which screen 22 is able to transition from a second lesser reflectivity state $R_2$ to the first greater reflectivity state $R_1$. If light from ambient light source 26 is not sufficiently darkened, cut off or terminated when screen 22 completes its transition to the first greater reflectivity state $R_1$, an excessive amount of ambient light may be unintentionally reflected off of screen 22, potentially reducing image quality. As further shown by FIG. 3, timing sequence 50 may be slightly modified to additionally include guard bands 54 (illustrated by dashed line succeeding the previous time at which screen 22 was to transition to the first greater reflectivity state $R_1$). Guard bands 54 constitute periods of time that elapse after ambient light source 26 is to complete its transition to the second lesser bright state $B_2$ before screen 22 begins its transition to the greater reflectivity state $R_1$. Guard bands provide tolerance to sequence 50 to accommodate potentially slower response times for ambient light source 26. Like guard bands 52, guard bands 54 may also be employed in sequence 40 shown in FIG. 2, in sequence 60 shown and described with respect to FIG. 4 or in other synchronization timing sequences between ambient light source 26 and screen 22.

Figure 4:
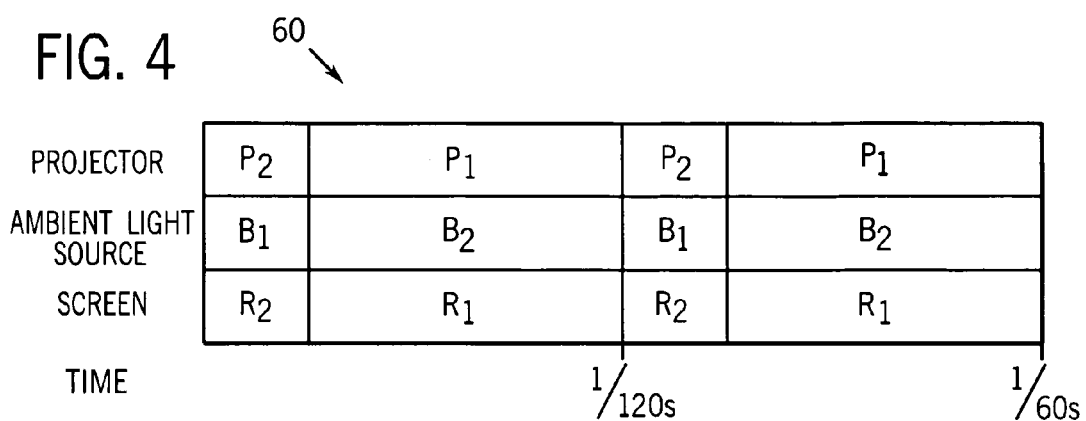
FIG. 4 illustrates another example embodiment of a synchronization timing sequence that may be employed by the display system of FIG. 1 according to one example embodiment.

FIG. 4 illustrates one example of a synchronization timing sequence 60 that may be utilized by synchronizer 28 to synchronize operation of projector 24 with ambient light source 26 with screen 22. As shown by FIG. 4, projector 24 flickers or modulates between a first projecting state $P_1$ in which light projected by projector 24 has a first greater intensity and a second projecting state $P_2$ in which light projected by projector 24 has a lesser intensity (including a zero intensity, i.e. when no light is projected by projector 24). As further shown by FIG. 4, modulation of projector 24 between the first projection state and the second projection state is synchronized with the modulation of ambient light source 26 between the second brightness state $B_2$ and the first brightness state $B_1$ and with the modulation of screen 22 between the first reflectivity state $R_1$ and the second reflectivity state $R_2$. Like ambient light source 26 and screen 22, projector 24 modulates between the first and second projection states at a frequency greater than or equal to the flicker fusion frequency of a human eye (nominally about 50 Hertz). In the particular example shown, projector flickers at a frequency of approximately 120 Hertz and is in the first projection state $P_1$ while ambient light source 26 is in the second brightness state $B_2$ and while screen 22 is in the first reflectivity state $R_1$.

Because projector 24 is modulated in synchronization with screen 22 and ambient light source 26, the light source of projector 24 may be cooled or otherwise be allowed to operate at lower power (including zero power) during the second projection state $P_2$, allowing the light source to be overdriven so as to emit a greater intensity light than would otherwise be achievable during the first projection state $P_1$. As a result, the brightness or intensity of the image projected by projector 24 may be greater without the use of higher intensity and generally more expensive light sources in projector 24. Because projector 24 may be operated at lower power or be modulated so as to not project light during projection state $P_2$, energy savings may result. At the same time, the quality of the projected image viewed by an observer does not generally suffer since light that would be projected by projector 24 during projection state $P_2$ would otherwise be absorbed by screen 22 in the second lesser reflectivity $R_2$ rather than being substantially reflected.

Figure 5A:
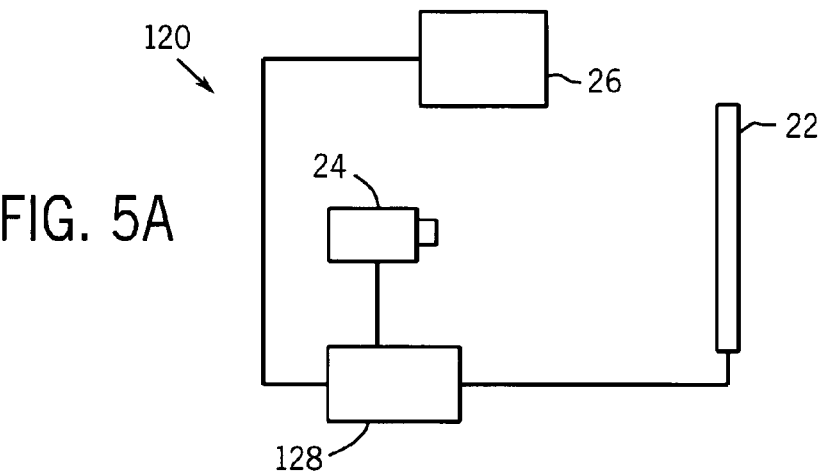
FIG. 5A schematically illustrates another embodiment of the display system of FIG. 1 according to one example embodiment.

FIG. 5A schematically illustrates display system 120, a particular embodiment of display system 20 shown and described with respect to FIGS. 1-4. Display system 120 is similar to display system 20 except that display system 120 has a synchronizer 128 comprising a processing unit configured to generate control signals to both screen 22 and ambient light source 26 so as to synchronize flickering or modulation of screen 22 and ambient light source 26 such as according to the timing sequences described in FIGS. 2 and 3. For purposes of this disclosure, the term "processing unit" shall mean a presently available or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Synchronizer 128 is not limited to any specific combination of hardware circuitry and software, nor to any particular source for the instructions executed by the processing unit.

The processing unit of synchronizer 128 may communicate with screen 22 and ambient light source 26, as well as potentially with projector 24, by one of various communication modes such as electrical wire or cabling, optical wire or cabling, infrared or other wireless signals. The processing unit comprising synchronizer 128 may be configured to supply power in an intermittent fashion so as to modulate operation of screen 22 and ambient light source 26 or may supply electrical or optical signals directing components associated with screen 22 and ambient light source 26 to modulate such devices. In one embodiment, synchronizer 128 may distribute data or synchronization information over existing electrical wiring such as an alternating current line, wherein screen 22 and ambient light source 26 receives the data or synchronization information which serves as a timing and synchronization signal for screen 22 and ambient light source 26. In such an embodiment, synchronizer 128 may be physically incorporated into either screen 22 or ambient light source 26. In yet another embodiment, synchronizer 128 may be physically incorporated into projector 24 which serves as a master device that sends timing and synchronization signals or data to other slave devices such as screen 22 and ambient light source 26.

According to one example embodiment, the processing unit of synchronizer 128 additionally provides control signals to projector 24 to further synchronize projector 24 with screen 22 and ambient light source 26. For example, in one embodiment, synchronizer 128 may be additionally configured to synchronize screen 22, projector 24 and ambient light source 26 according to the synchronization timing sequence 60 shown in FIG. 4. In other embodiments, synchronizer 128 may synchronize such components in other fashions.

Figure 5B:
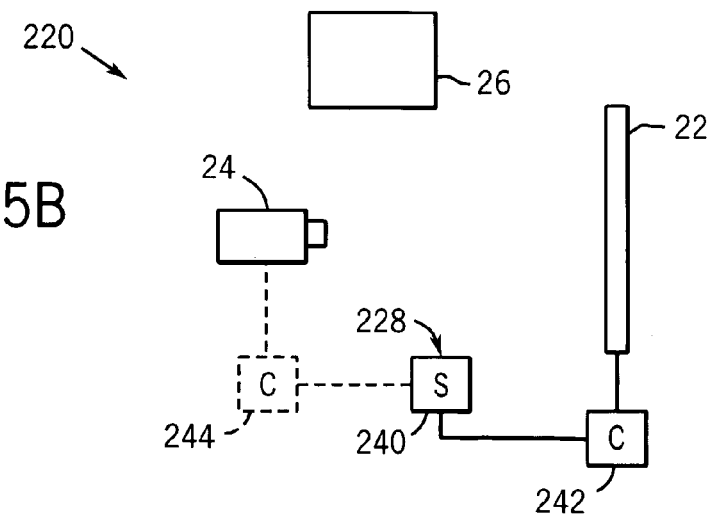
FIG. 5B illustrates another embodiment of the display system of FIG. 1 according to an example embodiment.

FIG. 5B schematically illustrates display system 220, another particular embodiment of display system 20. Display system 220 is similar to display system 20 except that display system 220 includes a synchronizer 228. Those remaining components of display system 220 which correspond to components of display system 20 are numbered similarly. In the particular embodiment shown in FIG. 5B, ambient light source 26 is configured to flicker to modulate at a predefined or selected frequency greater than a flicker fusion frequency of a human eye. Synchronizer 228 includes sensor 240 and controller 242. In one embodiment, sensor 240 constitutes a light sensor configured to sense light emitted or transmitted by ambient light source 26 so as to detect flickering of ambient light source 26. In one embodiment, sensor 240 constitutes a photo sensitive electronic device such as a CdS (Cadmium Sulfide) photoresistor which senses changes in light condition and is of sufficient speed as to adequately sense the light level changes. Other sensor examples include phototransistors and solar cells which have sufficient speed. In other embodiments, sensor 240 may constitute an electrical connection or other sensor directly connected to or associated with ambient light source 26 to detect a characteristic of ambient light source 26 which corresponds to its flickering. Sensor 240 communicates signals to controller 242 based upon the flickering of light from ambient light source 26.

Controller 242 constitutes a processing unit configured to generate control signals directing the operation of screen 22 based upon signals received from sensor 240. In response to control signals from controller 242, screen 22 separates or modulates between reflectivity states such as a first greater reflectivity state $R_1$ and a second less reflectivity state $R_2$. In one embodiment, controller 242 may be physically coupled to sensor 240 as a distinct unit connected to screen 22. In another embodiment, one or both of controller 242 and sensor 240 may be physically incorporated as part of screen 22.

As indicated in phantom, in other embodiments, sensor 240 may be additionally connected to an additional controller 244. Controller 244 may constitute a processing unit configured to generate control signals directing the operation of projector 24 based upon signals from sensor 240. In such an alternative embodiment, the operation of projector 24 may be synchronized with the operation of screen 22 or the sensed brightness states of ambient light source 26. In other embodiments, controller 244 may be omitted.

Figure 5C:
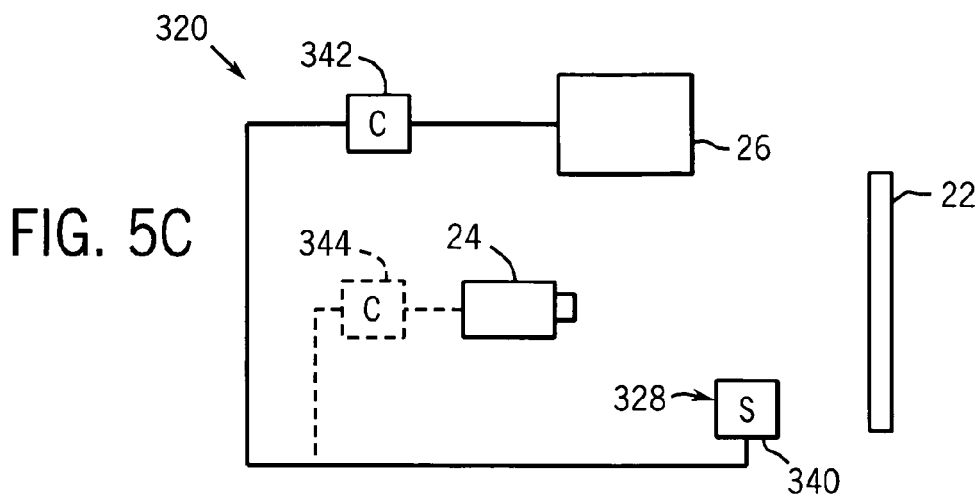
FIG. 5C illustrates another embodiment of the display system of FIG. 1 according to an example embodiment.

FIG. 5C schematically illustrates display system 320, another embodiment of display system 20. Display system 320 is similar to display system 20 except that display system 320 includes synchronizer 328. Those remaining components of display system 320 which substantially correspond to components of system 20 are numbered similarly. In the example shown in FIG. 5C, screen 22 is configured to flicker or modulate between a first greater reflectivity state $R_1$ and a second lesser reflectivity state $R_2$ at a predefined or preselected frequency greater than a flicker fusion frequency of the human eye. In one embodiment, screen 22 may include an oscillator and a driver and power supply which facilitate a free running flicker of screen 22. In other embodiments, other electronic circuitry or components may be utilized to facilitate a free running flicker of screen 22 at a frequency greater than a flicker fusion frequency of the human eye.

Synchronizer 328 includes sensor 340 and controller 342. Sensor 340 constitutes a sensor configured to detect the flickering or modulation of screen 22. In one embodiment, sensor 340 may constitute an optical sensor. According to one exemplary embodiment, sensor 340 may constitute a phototransistor biased to support the speed and light reflectance levels of the screen. This photo transistor may be paired with its own light source such as an LED in a configuration that adequately biases and triggers the sensor 340 by the change in reflectivity of the screen. This light source would reduce light interference from other sources including the out-of-sync ambient light source. Another configuration may include the flickering light source in such a way whereby the combination and state of the light source and screen reflectance could generate an error signal which the synchronizer could use to keep the flickering light in sync with the free running frequency of the screen. According to another embodiment, sensor 340 may constitute an electrical or other sensor directly associated with screen 22 to detect a characteristic of screen 22 which corresponds to its flickering. Sensor 340 communicates signals based upon the sensed or detected flickering to controller 342.

Controller 342 constitutes a processing unit configured to generate control signals directing the flickering or modulation of ambient light source 26 based upon signals received from sensor 340. In particular, controller 342 generates control signals directing ambient light source 26 to be in the first greater brightness state $B_1$ when screen 22 is in the second lesser reflectivity state $R_2$ and to also cause ambient light source 26 to be in the second lesser brightness state $B_2$ when screen 22 is in the first greater reflectivity state $R_1$. In one embodiment, sensor 340 and controller 342 may be incorporated as an independent unit configured to communicate with ambient light source 26. In still another embodiment, sensor 340 and/or controller 342 may alternatively be physically incorporated as part of ambient light source 26. In yet another embodiment, sensor 340 and/or controller 342 may alternatively be physically incorporated as part of a wall switch which controls ambient light source 26.

As shown in phantom, sensor 340 may be configured to additionally communicate with a controller 344. Controller 344 may constitute a processing unit configured to generate control signals directing the operation of projector 24 based upon signals received from sensor 340. In such an embodiment, operation of projector 24 may also be synchronized with or based upon flickering of screen 22 and potentially synchronized with flickering of ambient light source 26.

Figure 5D:
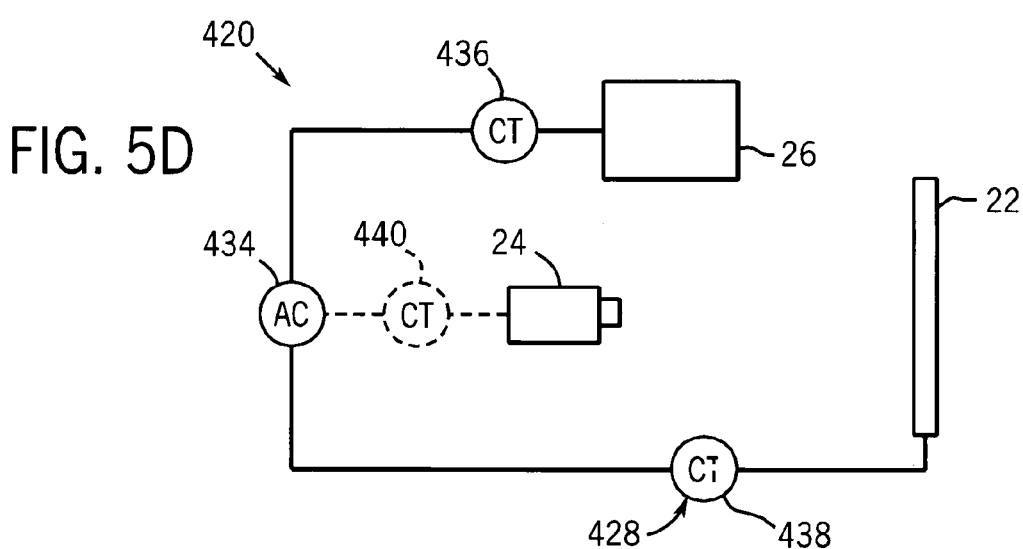
FIG. 5D illustrates another embodiment of the display system of FIG. 1 according to an example embodiment.

FIG. 5D schematically illustrates display system 420, another embodiment of display system 20. Display system 420 is similar to display system 20 except that display system 420 includes synchronizer 428 in lieu of synchronizer 28. Those remaining components of display system 420 which correspond to display system 20 are numbered similarly. Synchronizer 428 synchronizes flickering of screen 22 and ambient light source 26 based upon an alternating current power source 434. In one embodiment, alternating current power source 434 constitutes residential alternating current which has a varying polarity in the form of a sine wave. For example, in the United States, alternating current power (AC) source 434 changes polarity at a frequency of 60 Hertz. Synchronizer 428 utilizes the frequency at which the current changes polarity as the basis for the frequency at which screen 22 and ambient light source 26 are modulated or flickered.

According to one example embodiment, synchronizer 428 includes current treatment devices 436 and 438. Current treatment device 436 constitutes a device configured to treat or modify the form of electrical current provided by AC power source 434 such that current being supplied to ambient light source 26 is pulsed at a frequency greater than the flicker fusion frequency of a human eye. Accordingly to one embodiment, current treatment device 436 constitutes electrical circuitry configured to rectify, reduce the voltage and to trim the rectified alternating current signals to a small duty cycle square wave. According to one embodiment, current treatment device 436 may constitute a dimmer switch or other similar device provided as an independent module or mounted in a wall, floor or other building structure configured to treat or modify the form of electrical current provided by AC power source 434 such that ambient light source 26 is pulsed at a frequency greater than the flicker fusion frequency of a human eye.

Figure 6:
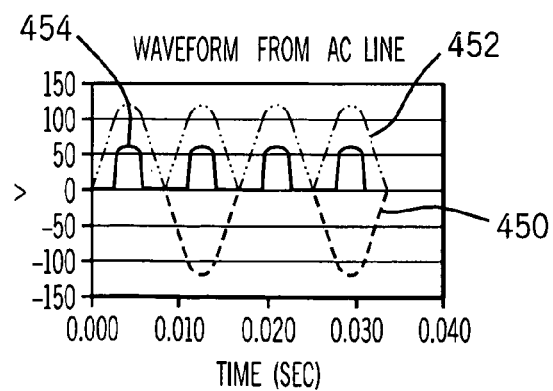
FIG. 6 is an example embodiment of a graph illustrating modification of alternating current performed by a current treatment device of the display system of FIG. 5D according to an example embodiment.

FIG. 6 is a graph depicting a 60 Hertz residential AC voltage waveform 450, the voltage after it has been rectified (waveform 452) and the voltage waveform after it has been rectified, trimmed and scaled or reduced in voltage per the voltage specifications for ambient light source 26 (current 454). The resulting scaled, thresholded (i.e. qualified by comparison of waveform 452 to a threshold level) and rectified waveform 454 pulses at a frequency of 120 Hertz. As a result, the scaled, thresholded and rectified waveform 454 may be directly supplied to ambient light source 26 to correspondingly cause ambient light source 26 to pulse, flicker or modulate at a frequency of 120 Hertz, a frequency greater or equal to the flicker fusion frequency of the human eye (about 50 Hertz).

Current treatment device 438 is similar to current treatment device 436 in that current treatment device 438 modifies the characteristics of the alternating current being supplied by AC power source 434 to a desired form for triggering flickering of screen 22. Current treatment device 438 constitutes electrical circuitry configured to sense the phase and modify the alternating current and voltage signals to levels and timing appropriate to drive the screen to different reflectance levels. In one embodiment, like current treatment device 436, current treatment device 438 constitutes electrical circuitry configured to rectify, threshold or trim, and scale the alternating current from source 434 for use by screen 22. In some embodiments, current treatment device 438 may not rectify the alternating current from source 434 for use by screen 22 such as when the reflectivity of screen 22 is modulated by applying different voltages to a polymer dispersed liquid crystal.

Current treatment device 438 the voltage from AC power source 434 such that the voltage supplied is in the form of a pulse having a frequency corresponding to but 180 degrees out of phase with the frequency of the voltage being supplied to ambient light source 26 by current treatment device 436 with the opposite duty cycle (1-time of ambient pulse). In the particular example described in which voltage is supplied to ambient light source 26 at a frequency of 120 Hertz, current treatment device 438 modifies current from alternating current source 434 such that current is supplied to screen 22 at a frequency of 120 Hertz, but 180 degrees out of phase with the current being supplied to ambient light source 26.

In one embodiment, current treatment device 436 is physically incorporated as part of ambient light source 26 while current treatment device 438 is physically incorporated as part of screen 22. In other embodiments, current treatment devices 436 and 438 may constitute independent components or may be combined in a unit independent of screen 22 and ambient light source 26. In another embodiment current treatment device 438 may be included in the ambient light switch for the room. In still other embodiments, synchronizer 428 may alternatively include other timing components in place of current treatment device 436 or current treatment device 438. For example, current treatment device 436 or current treatment device 438 may be replaced with sensor 340 and controller 342 or sensor 240 and controller 242, respectively. One of current treatment devices 436 and 438 may alternatively be replaced with a controller, such as synchronizer 128, configured to modulate one of screen 22 and ambient light source 26 in a frequency corresponding to the frequency at which that of the other screen 22 and ambient light source 26 is modulated.

As further shown in phantom in FIG. 5D, display system 420 may additionally include current treatment device 440. Current treatment device 440 is similar to current treatment device 438 in that current treatment device 440 constitutes electrical circuitry configured to modify the generally sinusoidal form of voltage being supplied from source 434 for use in synchronizing the operation of projector 24 with screen 22 and ambient light source 26. According to one embodiment, current treatment device 440 has electrical circuitry configured to rectify, threshold or trim and scale voltage from source 434 such that a voltage is supplied to projector 24 and pulses for trigger timing at a frequency of the rectified voltage (120 Hertz). In one embodiment, current treatment device 440 is configured such that the pulsed voltage being supplied to projector 24 is 180 degrees out of phase with the voltage being supplied to ambient light source 26 as a result of modification by current treatment device 436.

Although display system 420 has been described as modulating or synchronizing the modulation or flickering of screen 22, ambient light source 26 and potentially projector 24 based upon AC power source 434 comprising U.S. residential 60 Hertz alternating current, projector system 420 may alternatively be utilized with other AC power sources 434. For example, projector system 420 may alternatively be utilized with European AC sources which have a frequency of 50 Hertz. In such an environment, the rectified waveform would have a frequency of 100 Hertz such that the voltage waveform supplied to screen 22, ambient light source 26 and potentially projector 24 would have a frequency of 100 Hertz. Other frequencies can be derived but fundamentally the trigger signal can be derived from the phase information of the common AC source.

Overall, display system 420 facilitates synchronized flickering or modulation of multiple components utilizing an existing timing device provided by AC power source 434. As a result, screen 22, ambient light source 26 and potentially projector 24 may be synchronized without being directly connected to one another and without being connected to a common controller. Rather, current treatment devices 436, 438 and 440 may be incorporated into screen 22, ambient light source 26 and projector 24, respectively, enabling screen 22, ambient light source 26 and projector 24 to be simply plugged into AC power source 434 or electrically connected to AC power source 434. In addition, multiple components of ambient light source 26 may be simply plugged into or electrically connected to AC power source 434. Because current treatment devices 436, 438 and 440 may omit processing units for synchronizing flickering of screen 22, ambient light source 26 and projector 24, display system 420 may be less expensive and easier to implement.

Figure 7:
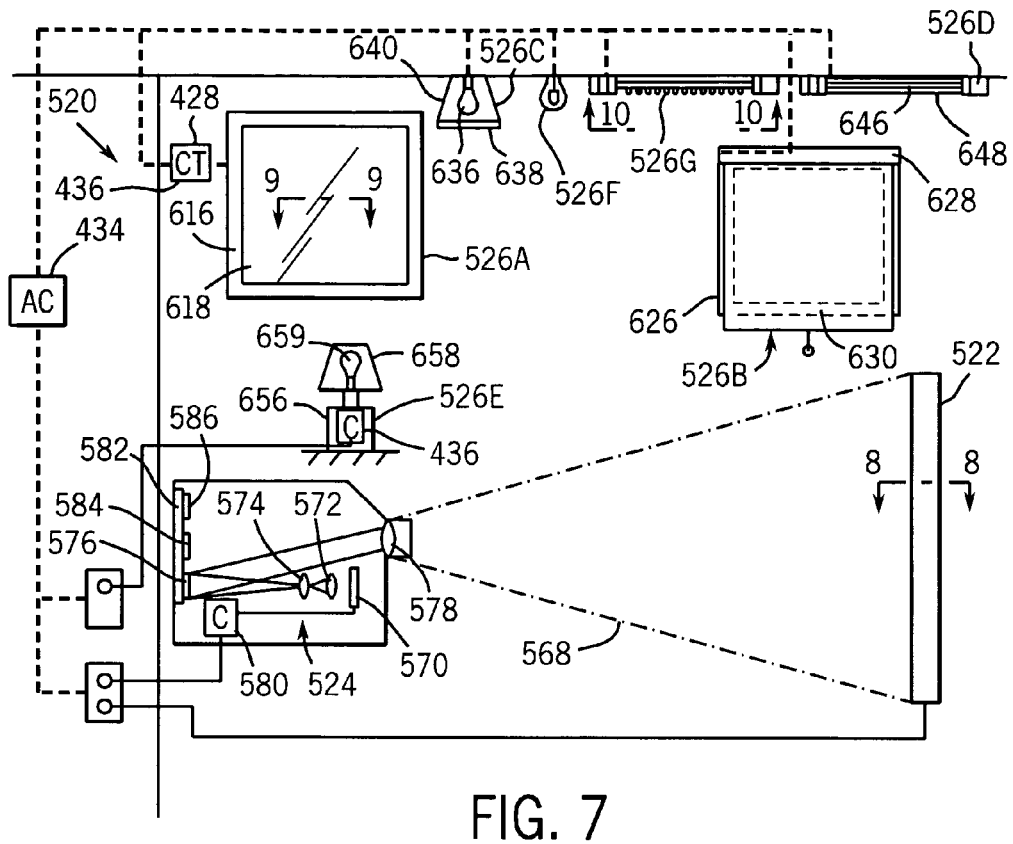
FIG. 7 schematically illustrates another embodiment of the display system of FIG. 1 according to an example embodiment.

FIG. 7 schematically illustrates display system 520, one example embodiment of display system 420. Display system 520 includes screen 522, projector 524 and ambient light sources 526A, 526B, 526C, 526D, 526E, 526F and 526G, and synchronizer 428. Screen 522 constitutes a screen configured to flicker or modulate between a first greater reflective state $R_1$ and a second lesser reflective state $R_2$ at a frequency greater than a flicker fusion frequency of a human eye.

Figure 8:
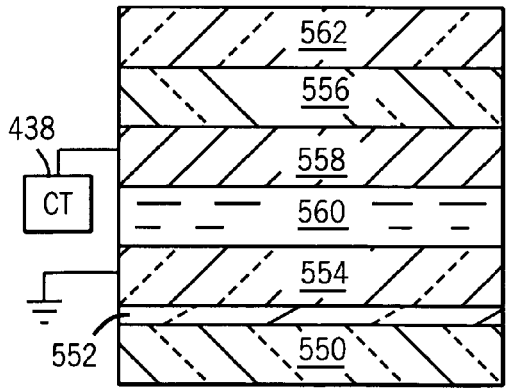
FIG. 8 is a sectional view schematically illustrating an embodiment of a screen of the display system of FIG. 7 taken along line 8-8 of FIG. 7 according to an example embodiment.

FIG. 8 is a sectional view schematically illustrating one embodiment of screen 522 in more detail. As shown by FIG. 8, screen 522 includes back substrate 550, reflective layer 552, electrode 554, substrate 556, electrode 558, optical charge responsive material 560 and coatings 562. Back substrate 550 serves as a support for reflective layer 552. In one embodiment, back substrate 550 comprises dielectric material such as silicon. In other embodiments, back substrate 550 may be formed from other materials such as glass and the like.

Reflective layer 552 comprises a layer of visible light reflecting material supported by back substrate 550. According to one example embodiment, layer 552 is formed from aluminum. In other embodiments, layer 552 may be formed from other materials such as silver or other thin metal coatings.

Electrode 554 comprises a layer of electrically conductive material configured to be electrically charged so as to apply electric field across optical charge, responsive material 560. In the particular embodiment illustrated, electrode 554 is formed from transparent or translucent electrically conductive materials that overlie reflective layer 552. In one embodiment, electrode 554 may comprise a conductive material such as indium tin oxide (ITO) or polyethylene dioxythiophene (PEDOT). In other embodiments, electrode 554 may be formed from other transparent electrically conductive materials.

Front substrate 556 comprises a support structure for electrode 558. Front substrate 556 is formed from an optically transparent and clear dielectric material. In one embodiment, front substrate 556 may be formed from an optically clear and flexible dielectric material such as polyethylene terephthalate (PET). In other embodiments, front substrate 556 may be formed from other transparent dielectric materials that may be inflexible such as glass.

Electrode 558 comprises a layer of transparent or translucent electrically conductive material formed upon substrate 556. Electrode 558 is configured to be charged so as to cooperate with electrode 554 to create an electric field across optical charge responsive material 560. In one embodiment, electrode 558 comprises a transparent conductor such as indium tin oxide (ITO) or polyethylene dioxythiopene (PE-DOT). In other embodiments, other transparent conductive materials may be used. In the particular embodiment shown in which projection system 520 utilizes synchronizer 428, electrode 558 is electrically connected to current treatment device 438 while electrode 554 is electrically connected to ground in other embodiments, this arrangement may be reversed. In still other embodiments, electrodes 554 and 558 may be charged to distinct voltages by other devices such as synchronizer 28 or controller 242.

Optical charge responsive material 560 comprises a layer of material configured to change its transparency and reflectivity in response to changes in an applied voltage or charge. In one embodiment, optical charge responsive material 560 may change from a transparent clear state, allowing light to pass through optical charge responsive material 560 and to be reflected by reflective layer 552 to a generally opaque state in which light is absorbed by optical charge responsive material 560. According to one example embodiment, optical charge responsive material 560 may comprise a dichroic dye doped polymer dispersed liquid crystal (PDLC) material in which pockets of liquid crystal material are dispersed throughout a transparent polymer layer. In other embodiments, optical charge responsive material 560 may comprise other materials such as electrochromic material, such as tungsten oxide, or photochromic or electrophoretic material.

Coatings 562 comprises one or more layers deposited or otherwise formed upon substrate 556 opposite to electrode 558. Coatings 562 may comprise a front plane diffuser and may include an anti-reflection layer such as anti-glare surface treatment, an ambient rejection layer, such as a plurality of optical band pass, or a series of micro lenses and/or partial diffuse layers. In other embodiments, coating layer 562 may be omitted. In other embodiments, screen 22 may comprise other structures configured to flicker or modulate between two or more reflective states.

As shown by FIG. 7, projector 524 comprises a device configured to sequentially project a series of colors (light of different wavelengths) towards screen 22 so as to create an image upon screen 22. In the particular example illustrated, projector 524 comprises a digital light processing (DLP) projector which generally includes light source 570, optics 572, optics 574, digital micro mirror device (DMD) 576 and projection lens 578. Light source 570 comprises a multi-colored (or broad spectrum) solid state lamp configured to sequentially emit different colored light. In one embodiment, light source 570 comprises a multi-colored light emitting diode lamp including multiple differently colored light emitting diodes. In one embodiment, light source 570 includes diodes having red, green and blue colors. In another embodiment, light source 570 may include light emitting diodes having red, green and blue colored light emitting diodes plus possibly white light emitting diodes. The differently colored light emitting diodes are sequentially actuated in response to control signals or applied voltages from controller 580 which comprises a processing unit and a power switching device to selectively direct power to each of the sets of differently colored light emitting diodes of light source 570.

Optics 572 are generally positioned between light source 570 so as to condense light from light source 570 towards optics 574. In one embodiment, optics 572 may include a light pipe or integrating rod. Optics 574 comprises one or more lenses or mirrors configured to focus and direct light towards DMD 576. In one embodiment, optics 574 may comprise lenses which focus and direct the light. In another embodiment, optics 574 may additionally include mirrors which re-direct light onto DMD 576.

In one embodiment, DMD 576 comprises a semiconductor chip covered with a multitude of miniscule reflectors or mirrors which may be selectively tilted between "on" positions in which light is redirected towards lens 578 and "off" position in which light is not directed towards lens 578. The mirrors are switched "on" and "off" at a high frequency so as to emit a grayscale image. In particular, a mirror that is switched on more frequently reflects a light gray pixel of light while the mirror that is switched off more frequently reflects a darker gray pixel of light. In this context, "grayscale", "light gray pixel", and "darker gray pixel" refers to the intensity of the luminance component of the light and does not limit the hue and chrominance components of the light. The "on" and "off" states of each mirror are coordinated with colored light from light source 70 to project a desired hue of colored light towards lens 578. The human eye blends rapidly alternating flashes to see the intended hue of a particular pixel in the image being created. In the particular example shown, DMD 576 is provided as part of a DLP board 582 which further supports a processor 584 and associated memory 586. Processor 584 and memory 586 are configured to selectively actuate the mirrors of DMD 576. In other embodiments, processor 584 and memory 586 may alternatively be provided by or associated with controller 580.

Because ambient light sources 526 are flickering and are synchronized with screen 522 so as to be in a lesser brightness state $B_2$ while screen 522 is in a greater reflectivity state $R_1$, the color contrast and intensity of light projected by projector 524 is not reduced or washed out by light from ambient light sources 526. As a result, less expensive or lower intensity light sources, such as light source 570 may be employed in projector 524. Because projector 524 facilitates the use of generally lower intensity light emitting diodes for light source 570, the cost and complexity of projector 524 is reduced.

Ambient light sources 526 either emit visual light or transmit visual light to the environment of screen 522 and projector 524. Ambient light sources 526 flicker between distinct brightness states at a frequency greater than or equal to a flicker fusion frequency of a human eye. Ambient light sources 526A-526E modulate between distinct light transmissive states at a frequency greater than or equal to a flicker fusion frequency of a human eye. In the particular embodiment illustrated, each of ambient light sources 526A-526E includes a light transmission modulator 602 shown in FIG. 9. Light transmission modulator 602 comprises a series of layers configured to exhibit varied light transmission properties based upon an applied voltage or charge. Light transmission modulator 602 includes substrate 604, electrode 606, substrate 608, electrode 610, optical charge responsive material 612 and coating layer 614.

Ambient light sources 526A and 526B selectively permit the transmission of visual light from another source, such as the sun. Ambient light source 526A generally comprises a window including a frame 616 and a pane 618 and light transmission modulator 602. Frame 616 supports pane 618 and may include electrical components of ambient light source 526A. In one embodiment in which projection system 520 includes synchronizer 428, frame 600 houses current treatment device 436.

Figure 9:
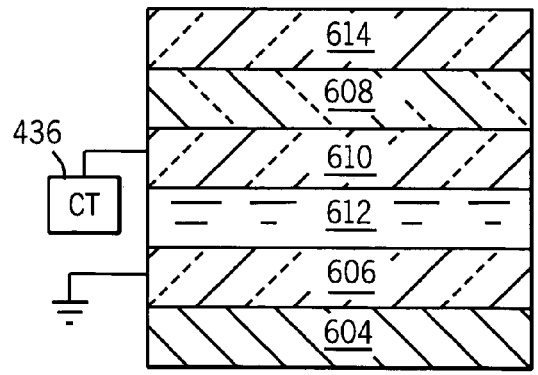
FIG. 9 is a sectional view of an embodiment of a light source modulator of the display system of FIG. 7 taken along line 9-9 according to an example embodiment.

In FIG. 9, substrate 604 comprises one or more layers of transparent materials serving as a foundation of support for electrode 606. In one embodiment, substrate 604 may comprise glass. In another embodiment, substrate 604 may comprise other transparent flexible or inflexible dielectric materials such as Plexiglas or polyethylene terephalate (PET).

Electrode 606 comprises one or more layers of transparent electrically conductive material. In one embodiment, electrode 606 is formed from indium tin oxide. In other embodiments, electrode 606 may be formed from other transparent electrically conductive materials such as single wall carbon nano tubes such as available from Ikos Systems and thin layers of metals such as gold or silver. Substrate 608 comprises one or more layers of transparent material serving as a foundation or support for electrode 610. In one embodiment, substrate 608 may comprise glass. In other embodiments, substrate 608 may comprise other transparent flexible or inflexible dielectric materials such as Plexiglas or PET.

Electrode 610 comprises one or more layers of transparent electrically conductive material. In one embodiment, electrode 610 is formed from indium tin oxide. In other embodiments, electrode 610 may be formed from other transparent electrically conductive materials.

Optical change responsive material 612 comprises a layer of material configured to change its transparency and/or light absorption in response to changes in an applied voltage or charge. In one embodiment, material 612 may change from a transparent clear state, allowing light to pass through material 612 to a reflective or absorbing state in which light is absorbed by material 612. According to one example embodiment, material 612 may comprise a dichroic dye doped polymer dispersed liquid crystal (PDLC) material in which pockets of liquid crystal material are dispersed throughout a transparent polymer layer. In other embodiments, material 612 may comprise other materials such as electro chromic material, such as tungsten oxide or photochromic or electrophoretic material. Optical charge responsive material 612 is generally located between electrodes 606 and 610. In response to a modulating charge applied to at least one of electrodes 606 and 610, material 612 also modulates between a first greater light transmissive state and a second lesser light transmissive state. Coating layer 614 comprises one or more substantially transparent layers deposited or otherwise formed upon substrate 608 opposite to electrode 610. Coating layer 614 may comprise a front plane diffuser and may include an anti-reflection layer such as an anti-glare surface treatment. In other embodiments, coating layer 614 may be omitted.

Pane 618 of FIG. 7 comprises one or more panes or panels of transparent material, such as glass, supported by frame 600.

Light transmission modulator 602 extends across pane 602 so as to selectively block the transmission of light or to allow transmission of light through pane 618. In one embodiment, light transmission modulator 602 (shown in FIG. 9) may be laminated, bonded or otherwise secured to and across pane 618. In another embodiment, light transmission modulator 602 may be supported by frame 616 so as to extend across and generally parallel to pane 618. In yet another embodiment, one or more portions of pane 618 may be omitted where light transmission modulator 602 has sufficient strength and rigidity. For example, in one embodiment, pane 618 may be omitted where one or both of substrates 604 and 608 is formed from a rigid dielectric material such as glass.

Ambient light source 526B includes window 626 and window shade 628. Window 626 comprises an opening through which light may pass to the environment of screen 522. In one embodiment, window 526 may include one or more transparent panes through which light may pass. In another embodiment, window 626 may include openings or at least partially transparent screens through which light may pass.

Window shade 628 comprises a device having a selectively transparent or selectively opaque window overlying portion 630. Portion 630 includes light transmission modulator 602 shown and described with respect to FIG. 9. In response to electric fields applied across optical charge responsive material 612, portion 630 modulates or flickers between a first visual light transmissive state and a second distinct transmissive state. In one embodiment, portion 630 flickers or modulates between a substantially opaque state in which portion 630 blocks light passing through window 626 and a substantially transparent state in which light passes through window 626 and through portion 630.

In the embodiment shown in FIG. 7, portion 630 and light transmission modulator 602 (shown in FIG. 9) are sufficiently flexible so as to permit portion 630 to be rolled up into a roll about an axis. In such an embodiment, substrates 604 and 608 may be formed from a flexible polymeric material such as PET or vinyl, electrodes 606 and 610 may be formed from a flexible transparent electrically conductive material such as indium tin oxide and optical charge responsive material 612 may be formed from and may comprise a material such as PDLC material. In one particular embodiment, substrates 604 and 608 may serve as opposite sides of portion 630. In other embodiments, substrate 604 or substrate 608 may be coupled to another transparent flexible material associated with portion 630.

Because portion 630 is flexible such that portion 630 may be rolled into a roll, shade 628 may comprise a pull-down shade which may be rolled up so as to extend across window 626 by different extents or so as to be completely retracted with respect to window 626. In other embodiments, shade 628 may comprise other configurations of shades or blinds having a portion 630 that overlies window 626 and includes light transmission modulator 602. For example, shade 628 may alternatively comprise a vertical blind, an accordion-style blind and the like.

Ambient light source 526C emits light at a frequency greater than a flicker fusion frequency of a human eye. Ambient light source 526C includes continuous light source 636 and cover 638. Continuous light source 636 comprises a source of continuous light such as an incandescent or fluorescent bulb. Light source 636 may be recessed within a wall or ceiling or may be partially enclosed by a housing 640. Cover 638 extends between light source 636 and screen 522. Cover 638 is formed from one or more layers of transparent material and additionally includes light transmission modulator 602 (shown in FIG. 9) extending substantially across cover 638. In one embodiment, cover 638 may be substantially provided by light transmission modulator 602. In operation, light transmission modulator 602 flickers or modulates between a first visual light transmissive state and a second distinct light transmissive state at a frequency greater than the flicker fusion frequency of a human eye.

Ambient light source 526D emits visual light at a frequency greater than or equal to the flicker fusion frequency of a human eye. Ambient light source 526D includes continuous light source 646 and cover 648. Light source 646 generally comprises an elongate tube configured to continuously emit light during operation. In one embodiment, light source 646 comprises a gas discharge light cell such as a fluorescent lighting tube.

Cover 648 comprises an elongate cylinder, tube or sleeve extending and positioned about lighting source 646. Cover 648 includes light transmission modulator 602 extending between source 646 and screen 522. In one embodiment, light transmission modulator 602 extends along a lower portion of cover 648 opposite a lower portion, such as the lower half, of light source 646.

In other embodiments, light transmission modulator 602 substantially extends about cover 648 and around or about light source 646. In one particular embodiment, cover 648 is removably positioned about light source 646, allowing light source 646 to be replaced without discarding cover 648. In another embodiment, cover 648 may be mounted to light source 646 or light transmission modulator 602 may be coated upon the tube of light source 646.

In another embodiment, cover 648 may be omitted where light source 646 comprises a gas discharge light cell, such as a fluorescent lighting tube, including short persistence phosphors. In such an embodiment, the tube includes axially extending pins configured to start charge and ground the gas discharge light cell or tube. Charging of the gas occurs at a frequency greater than a flicker fusion frequency of an observer. For example, in one embodiment, the charging of the gas cell may be at a frequency equal to an alternating current supplied to the cell such as 50 Hertz (Europe) or 60 Hertz (United States). In one embodiment, the short persistence phosphors absorb light from the excited gas and emit visual light.

The short persistence phosphors are also configured to flicker between bright states (such as an emitting state and a dark state) at a frequency greater than or equal to a flicker fusion frequency of an observer. In such an embodiment, the short persistence phosphors may have a duty cycle of less than 25% and nominally less than or equal to 10% with a decay time of less than or equal to 1% of the duty cycle. In one embodiment, the short persistence phosphors may comprise silver-activated zinc sulfide such as a P4 phosphor commercially available from Torr Scientific. In other embodiments, ambient light source 526D may comprise a gas discharge light cell including other short persistence phosphors having other duty cycles and decay times.

Ambient light source 526E is configured to emit visual light at a frequency greater than or equal to the flicker fusion frequency of a human eye. Ambient light source 526E generally comprises a lamp 656 and a lamp shade 658. Lamp 656 comprises a source of continuous light. For example, in one embodiment, lamp 656 may include an incandescent light bulb or a fluorescent bulb.

Lamp shade 658 is supported about the light bulb of lamp 656 and includes light transmission modulator 602 shown in FIG. 9. Light transmission modulator 602 extends between bulb 659 and screen 522. In one embodiment, light transmission modulator 602 extends along a portion of shade 658. In another embodiment, light transmission modulator 602 extends along a substantial entirety of shade 658 around bulb 659. In response to distinct electrical fields applied across optical charge responsive material 612, light transmission modulator 602 modulates or flickers between a first light transmissive state and a second distinct light transmissive state. As a result, shade 658 selectively attenuates light from bulb 659.

Ambient light source 526F comprises a device configured to emit visual light at a frequency greater than or equal to a flicker fusion frequency of a human eye. Ambient light source 526F may comprise a solid state light emitting device such as a light emitting diode light bulb having an arrangement of light emitting diodes and a threaded base configured to charge and ground the light emitting diodes. Examples of such light emitting diode bulbs are those commercially available from Enlux Lighting of Mesa, Ariz., and those available from Ledtronics, Inc., of Torrance, Calif. However, unlike such light emitting diode bulbs as those commercially available, ambient light source 526F is configured to flicker or modulate at a frequency greater than the flicker fusion frequency of a human eye. As a result, ambient light source 526 may be synchronized with flickering of screen 522 to enhance contrast in the presence of ambient light. According to one embodiment, ambient light source 526 is configured such that the light emitting diodes flicker at a frequency greater than or equal to a flicker fusion frequency of an observer and with the work duty cycle of less than 80%. In such an embodiment, projector 524 correspondingly projects light at least 20% of the time and screen 22 correspondingly is in the greater reflective state at least 20% of the time. In one embodiment, such light emitting diodes flicker at a frequency greater than or equal to the flicker fusion frequency of an observer and with a work duty cycle less than or equal to 50% and nominally less than or equal to about 25%. In one embodiment, the light emitting diodes of ambient light source 526 flicker between a first bright state having a peak intensity and a lesser bright state having a lesser intensity less than 80% of the peak intensity and nominally less than 50% of the peak intensity.

Figure 10:
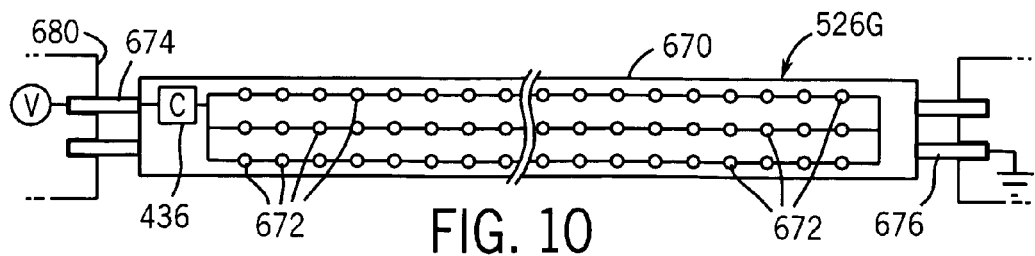
FIG. 10 is a bottom plan view of another embodiment of an ambient light source of the display system of FIG. 7 taken along line 10-10 according to an example embodiment.

Ambient light source 526G comprises a device configured to emit visual light at a frequency greater than or equal to the flicker fusion frequency of a human eye. Ambient light source 526G is shown in detail in FIG. 10. As shown in FIG. 10, ambient light source 526G comprises an elongate support structure 670, an elongate series or array of light emitting diodes 672 and axially extending conducting pins 674, 676. Support 670 supports light emitting diodes 672 which are electrically connected to conductive pins 674 and 676. Pin 674 is configured to be connected to a voltage source while pin 676 is configured to be electrically connected to ground. Support 670 and pins 674, 676 are specifically configured to mount within an existing socket 680 for a fluorescent tube or lamp. As a result, the fluorescent tube or lamp may be replaced with ambient light source 526G. However, unlike fluorescent lamps, ambient light source 526G is configured to flicker or modulate at a frequency greater than the flicker fusion frequency of a human eye. As a result, ambient light source 526 may be synchronized with flickering of screen 522 to enhance contrast in the presence of ambient light.

In the particular embodiment shown in FIG. 7, synchronizer 428 includes multiple current treatment devices which modify current from alternating current power source 434 so as to modulate or flicker screen 522 and each of ambient light sources 526. In the particular example shown, screen 522 includes circuit treatment device 438 (shown in FIG. 5D). Each of ambient light sources 526 includes a current treatment device 436 (shown and described with respect to FIG. 5D). In those ambient light sources 526 which include light transmission modulator 602, one of conductors 606, 608 is electrically connected to ground while the other of electrodes or conductors 606, 608 is electrically connected to current treatment device 436. As a result, the electric field between electrode 606 and 608 modulates such that the light reflectivity of light transmission modulator 602 also modulates. In other embodiments, projection system 520 may utilize other light synchronizers such as described with respect to FIGS. 5A-5C.

Figure 11:
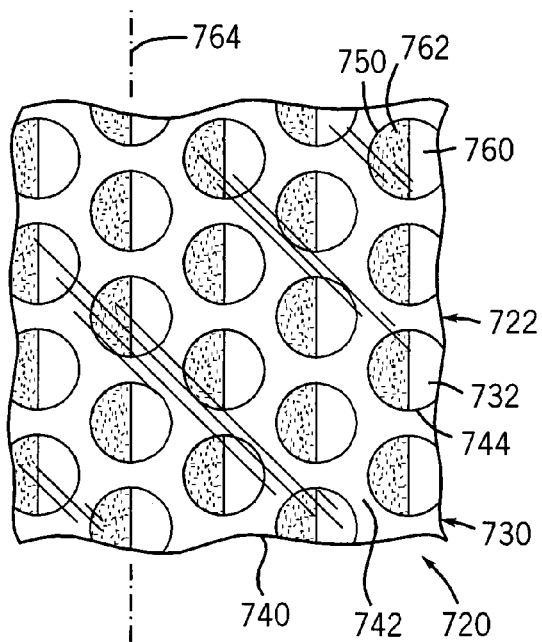
FIG. 11 is an enlarged fragmentary front plan view of another embodiment of a screen of the display system of FIG. 7 according to an example embodiment.
Figure 12:
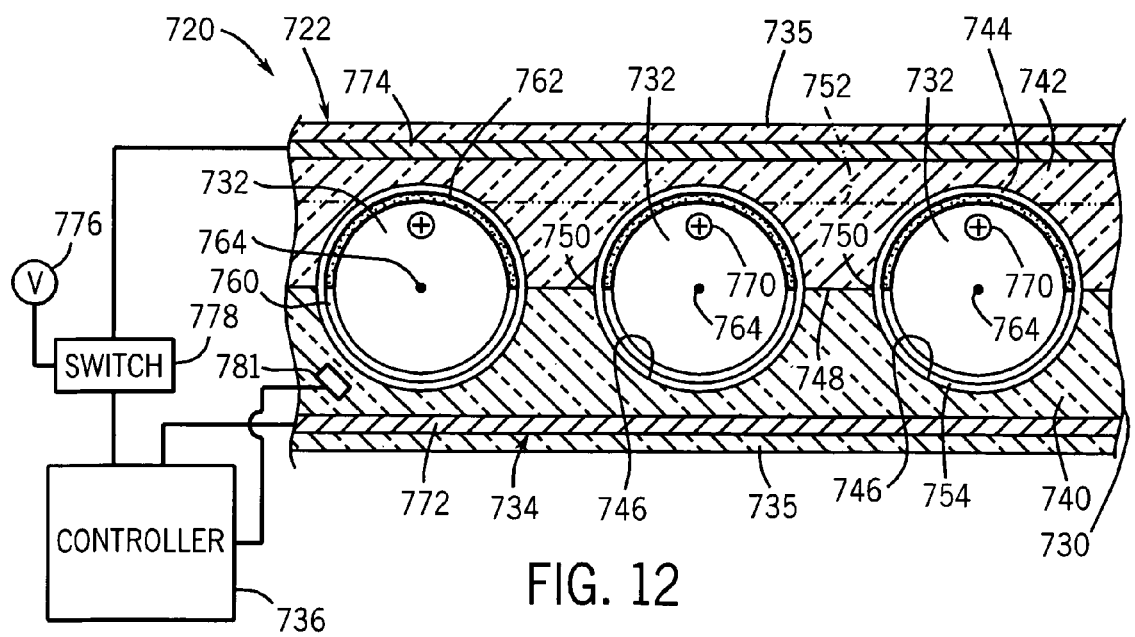
FIG. 12 is a sectional view of the screen of FIG. 11 according to an example embodiment.

FIGS. 11 and 12 schematically illustrate display system 720, another embodiment of display system 520. Display system 720 is similar to display system 520 except that display system 720 includes a light interaction system serving as a screen 722 in lieu of screen 522. For ease of illustration, FIGS. 11 and 12 merely illustrate screen 722. As shown by FIGS. 11 and 12, screen 722 includes support 730, light interaction members 732, actuator 734, outer layers 735 and controller 736. Support 730 constitutes one or more structures configured to rotatably support light interaction members 732. In the particular example illustrated, support 730 further houses and encloses members 732. In the example illustrated, supports 730 include support segments 740 and 742. Segment 740 constitutes a backing for members 732. In the example illustrated, segment 740 is formed from a dielectric material that is opaque or otherwise chosen to attenuate or absorb impinging light. In one example embodiment, segment 740 is formed from metal or plexiglass. In other embodiments, segment 740 may be formed from other light absorbing or light blocking materials.

Segment 740 includes wells 746 and intermediate faces 748. Wells 746 constitute depressions or cavities formed within segment 740 configured to partially receive members 732 to facilitate rotational and guidance of members 732. Wells 746 each form a opening or window 750 through which members 732 are exposed to interact with light. In the particular example illustrated, wells 746 are configured to receive and extend opposite to approximately one-half of their respective members 732. Those portions of members 732 projecting beyond wells 746 are otherwise exposed to interact with light. In other embodiments, wells 746 may alternatively be configured to receive and surround a greater or lesser portion of the respective members 732. In particular embodiments in which well 746 receives and surrounds greater than 50% of the respective member 732 such that members 732 are captured by segment 740, segment 742 may be omitted.

Intermediate faces 748 extend between consecutive wells 746 and face segment 742. In the particular example illustrated, faces 748 are configured so as to be of a lesser reflective state. In one example, faces 748 are configured to substantially absorb light. In one embodiment, faces 748 are provided with a dark light absorbing color or black.

Segment 742 extends opposite to segment 740 and cooperates with segment 740 to form cavities 744. Segment 742 is configured to permit light to pass through segment 742 and to impinge upon members 732. In one embodiment, segment 742 is formed from a transparent or translucent material or materials. In other embodiments, segment 742 may itself include openings of windows through which light may pass. As noted above, in particular embodiments in which windows 750 extend greater than 180 degrees about members 732, such as to the extent indicated by broken lines 752 so as to capture members 732, segment 742 may be omitted.

Cavities 744 are formed between segments 740 and 742 and enclose or surround members 732. Cavities 744 facilitate rotation of members 732. In the particular example illustrated, cavity 744 constitutes spherical or similarly configured cavities. In one embodiment, cavities 744 are further filled with a transparent or translucent lubricating fluid 754 such as water or oil. In other embodiments, lubricating fluid 754 may be omitted.

Members 732 constitute structures configured to be rotated between a first light interaction state and a second distinct light interaction state. In the particular example illustrated, each member 732 includes light interaction portions 760, 762. Portions 760 and 762 interact with light in a different manner from one another and are arranged so as to be selectively exposed through windows 750 as a result of rotation of members 732. In the particular example illustrated, portions 760 have a first reflectivity while portions 762 have a second lesser reflectivity.

In one embodiment, portions 760 are configured to substantially reflect impinging light. In such an embodiment, portions 760 may be provided with a white color. Portions 762 are configured to substantially attenuate or absorb light. In one embodiment, portions 762 may be provided with a dark color or a black color.

In the particular example illustrated, each of members 732 constitutes a sphere or similarly shaped structure such as a multi-sided particle in which portion 760 and portion 762 each extend approximately 180 degrees about a circumference of the respective member 732. In other embodiments, members 732 may be provided with portions 760 and 762 which extend about members 732 to different extents. Although portions 760 and 762 are illustrated as extending along an outer circumferential surface of members 732, portions 760 and 762 may alternatively be provided by opposing surfaces, plates or other structures extending across members 732. In other embodiments, one half of each of members 732 may serve as portions 760 while another half of each of members 732 serves as portion 762.

As shown by FIG. 11, in the particular embodiment illustrated, support 730 and members 732 are configured such that members 732 are arranged in a honeycomb pattern to facilitate closer positioning of members 732 for achieving a higher contrast than would be achieved without this arrangment. In other embodiments, support 730 and members 732 may have other arrangements.

According to one example embodiment, support 730 and members 732 may be formed by mixing optically and electrically anisotropic particles with an uncured material such as an elastomer. Following heat curing of the elastomer-particle mixture, the cured elastomer-particle sheet may be placed in a plasticizer fluid, such as a dielectric plasticizer. The plasticizer fluid is absorbed by the elastomer, causing the elastomer material to swell and creating voids or cavities around each of the optically and electrically anisotropic particles which do not substantially absorb the plasticizer fluid. Such voids or cavities are filled with the plasticizer fluid which may cause the encapsulated particles to acquire an electric charge which form poles 770. Upon application of an electric field across selected portions of the elastomer, the particles or members may rotate within such cavities 744 to present either portion 760 or 762 having the desired light interaction characteristics.

Actuator 734 constitutes one or more actuators configured to rotatably drive members 732 about rotational axes 764 between a first position in which portions 760 are exposed through window 750 and a second position in which portions 762 are exposed through window 750 (as shown in FIG. 12). In the particular example illustrated in FIG. 12, actuator 734 includes poles 770, electrodes 772, electrodes 774, voltage source 776 and switch 778. Poles 770 constitute portions coupled to members 732 which render members 732 electrically anisotropic, facilitating rotation of members 732 in response to an applied electric or magnetic field. In one embodiment, poles 770 are provided by fabricating or incorporating a magnet into or as part of each of members 732 or by fabricating or incorporating into each of members 732 a magnetic or ferrous material and magnetizing such material. In such an embodiment, electrodes 772 and 774 are configured as coils or similar structures to provide an electromagnet such that poles 770 and electrodes 772 and 774 operate in a similar fashion to that of an electric motor. In yet other embodiments, poles 770 may be coupled to each of members 732 in other fashions. In other embodiments, poles 770 may be formed by providing or otherwise forming anisotropic electrical charge in each of members 732. Although poles 770 are illustrated as having a positive polarity proximate to portions 762, poles 770 may alternatively have a negative polarity proximate to portions 762 or may have a positive polarity and be located proximate to portions 760.

Electrode 772 constitutes one or more electrically conductive structures positioned so as to apply an electric or magnetic field to members 732. In the particular embodiment illustrated, electrode 772 is an electrically conductive layer coupled to segment 740 proximate to wells 746. In the particular example illustrated, electrode 772 applies a common electric field at approximately the same time to each of members 732. In one embodiment, electrodes 772 extend along substantially an entire length of each member 732. In other embodiments, electrode 772 may constitute individual electrode portions or pads extending proximate to each member 732 and may extend along less than an entire length of each of members 732.

Electrode 774 constitutes an electrically conductive structure located generally opposite to electrodes 772 and configured to apply an electric or magnetic field to members 732. In the particular embodiment illustrated, electrode 774 is coupled to segments 742 and is translucent or transparent so as to permit light to pass through electrode 774 to impinge upon the exposed portions of members 732. In one embodiment, electrode 774 may be formed from a transparent electrically conductive material such as indium tin oxide (ITO). In other embodiments, electrode 774 may be formed from other transparent electrically conductive materials. In yet other embodiments in which electrode 774 is located between members 732 or other locations so as to not interfere with transmission of light through segment 742 to members 732, electrode 774 may be formed from electrically conductive materials that may not be transparent or translucent.

Switch 778 selectively connects electrodes 772 and 774 to source 776 in response to control signals from controller 736. In one embodiment, switch 778 may constitute a mechanical switch. In another embodiment, switch 778 may constitute a semiconductive switch such as a thin film transistor or metal-insulator-metal switch. In still other embodiments, other switching mechanisms may be employed.

Outer layers 735 overlie electrodes 772 and 774. Outer layers 735 are formed from one or more layers of transparent dielectric materials. Layers 735 electrically insulate electrodes 772 and 774 from the surrounding environment. In one embodiment, the outer layer 735 proximate to a front of screen 722 may additionally include other materials such that outer layer 735 at the front of screen 722 also serves to optically alter light being reflected by screen 722. In some other embodiments, one or both of outer layers 735 may be omitted.

Controller 736 constitutes a processing unit configured to generate control signals directing switch 778 to selectively apply voltage to electrodes 772 and 774 so as to rotate members 732 between different light interaction states. In the particular example illustrated in which members 732 have portions with different reflectivities, controller 736 generates control signals directing switch 778 to selectively apply a voltage to electrodes 772 and 774 so as to rotate members 732 between different reflectivity states. For purposes of the disclosure, the term "processing unit" shall mean a presently available or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory. (ROM), a mass storage device, or some other persistent storage. In other embodiments, hard wired circuitry may be used in place of or in combination with software instructions to implement the functions described. Controller 736 is not limited to any specific combination of hardware circuitry and software, nor to any particular source for the instructions executed by the processing unit.

In one embodiment, screen 722 may additionally include a sensor 781 positioned proximate to one of cavities 744 and one of members 732. Sensor 781 is configured to sense rotation and positioning of the particular member 732 to provide feedback to controller 736 for controlling the rotation of members 732. In one embodiment, sensor 781 may also be configured to serve as a trigger for ambient light sources 526A-526G or projector 524 to facilitate synchronization of such ambient light sources or the projector with screen 722. In one embodiment, sensor 781 may constitute an inductive sensor in which current is induced by movement of pole portion 770 relative to sensor 781. For example, in one embodiment, pole portion 770 may constitute an electrically polarized region, wherein sensor 781 is configured to detect a change in the electric field that results from a change in the positioning of the electrically polarized region of pole portion 770 to provide position information. In other embodiments, sensor 781 may constitute other devices configured to sense rotation and/or positioning of at least one of members 732.

Figures 13A, 13B, 13C, 13D:
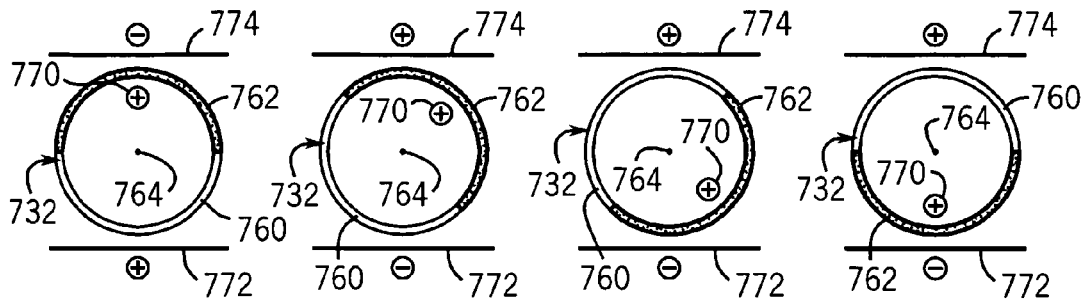
FIGS. 13A-13D are diagrams schematically illustrating one example mode of operation for the screen of FIG. 11 according to an example embodiment.

FIGS. 13A-13D schematically illustrate one example mode of operation for the light interaction system serving as screen 722 in display system 720. In particular, FIGS. 13A-13D schematically illustrates actuation of a single member 732 from a lesser reflective state in which portion 762 is exposed through a window 750 (shown in FIG. 12) to a greater reflective state in which portion 760 is subsequently exposed through window 750. As shown by FIG. 13A, controller 736 generates control signals causing electrodes 772 to emit a first magnetic or electric field and electrode 774 to emit a second opposite magnetic or electric field. This results in pole 770 being attracted towards electrode 774 such that portion 762 is exposed through window 750 (shown in FIG. 12).

As shown in FIGS. 13B, 13C and 13D, controller 736 generates control signals directing switch 778 to apply voltage to electrodes 772 and 774 such that such electrodes 772 and 774 emit opposite electric or magnetic fields as that shown in FIG. 13A. This results in poles 770 being attracted towards electrode 772 and being repelled from electrode 774. This further results in member 732 rotating to the final position shown in FIG. 13D in which portion 760 is exposed through window 750 to provide screen 722 with a greater reflective state as compared to when portion 762 was exposed through window 750.

In the particular example illustrated, each of members 732 are moved and retained in the position shown in FIG. 13A at the same time that ambient light sources 526A-526G are either emitting or transmitting ambient light to the environment of screen 722. Each of members 732 is set and retained in the position shown in FIG. 13D at the same time that ambient light sources 526A-526G are in their lesser bright state. As noted above, in one embodiment, ambient light sources 526A-526G are configured to flicker between the first bright state and the second lesser bright state at frequency greater than the flicker fusion frequency of a human eye. Likewise, controller 736 is configured to generate control signals directing each of members 732 to rotate between the first lesser reflective state (shown in FIG. 13A) and the second greater reflective state (shown in FIG. 13D) at the same frequency greater than the flicker fusion frequency of a human eye and in synchronization with the flickering of ambient light sources 526A-526G.

Figures 14A, 14B, 14C, 14D:
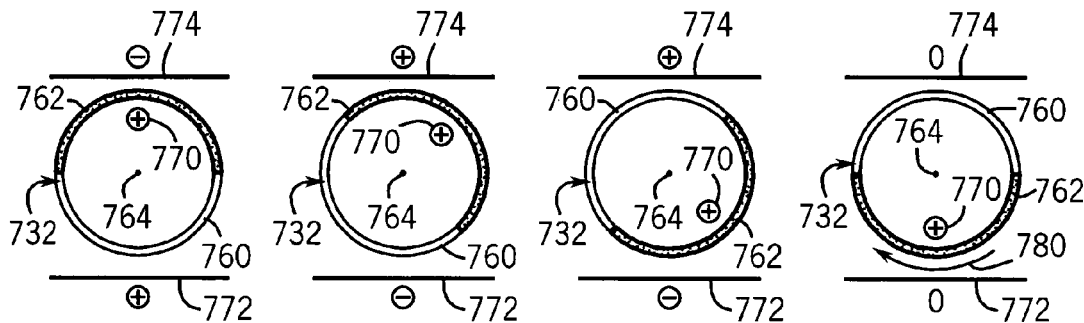
FIGS. 14A-14I are diagrams schematically illustrating another example mode of operation for the screen of FIG. 11 according to an example embodiment.

FIGS. 14A-14I schematically illustrates another example mode of operation for screen 722. FIG. 14A illustrates a member 732 in a position similar to that shown in FIG. 13A in which portion 762 is exposed through window 750 (shown in FIG. 12). In such a position, member 732 is in a less reflective state.

Figures 14E, 14F, 14G:
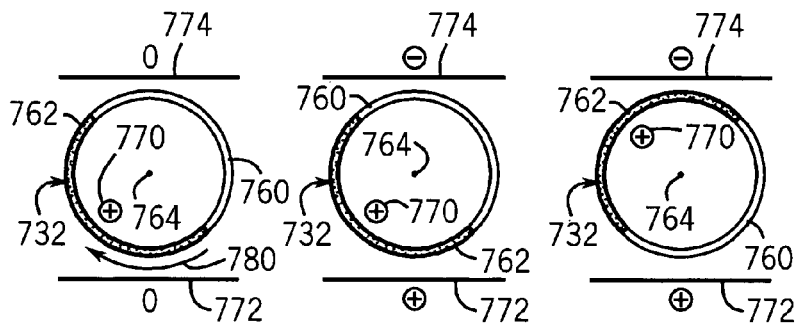

As shown in FIGS. 14B and 14C, controller 736 generates control signals directing switch 778 to apply voltages to electrodes 772 and 774 such that electrodes 772 and 774 apply opposite electrical fields or magnetic fields to member 732 as that shown in FIG. 14A. As a result, pole portion 770 becomes attracted to electrodes 772 rather than electrode 774, causing member 732 to begin to rotate about axis 764 so as to move pole portion 770 into closer proximity with electrode 772. However, unlike the mode of operation illustrated in FIGS. 13A-13D in which rotation of member 732 is stopped upon pole portion 770 being positioned most proximate to electrode 772 and in which portion 762 is exposed through window 750 (shown in FIG. 12), in the mode of operation illustrated in FIGS. 14A-14G, member 732 continues to rotate during operation of screen 722. In particular, as shown in FIGS. 14D and 14E, prior to pole portion 770 moving to a position in close proximity to electrode 772, controller 736 generates control signals resulting in cessation of the supply of voltage to electrodes 772 and 774 such that there is cessation, or substantial reduction, in the application of electric or magnetic fields to member 732. As a result, the rotation or momentum of member 732 continues to rotate pole portion 770 past the most proximate position with respect to electrode 772 as indicated by arrows 780.

As indicated by FIGS. 14F and 14G, once pole portion 772 is rotated past a most proximate position with respect to electrodes 772, controller 736 generates control signals causing switch 778 to transmit voltages to electrodes 772 and 774 such the electrodes 772 and 774 exhibit the same polarity or apply the same magnetic field as that previously applied to member 732 as shown in FIG. 14A. As a result, polar portion 770 is once again attracted to electrode 774 such that member 732 is further rotatably driven about axis 764. In particular embodiments, the speed at which each of member 732 have rotatably driven about axis 764 may be gradually increased or ramped up.

Figures 14H, 14I:
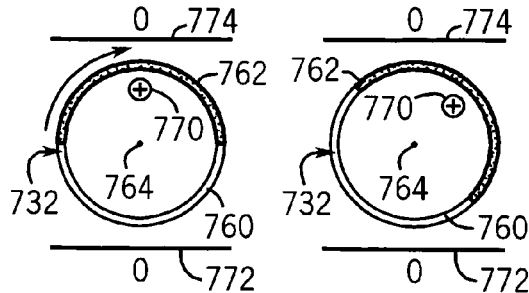

Prior to pole portion 770 reaching a most proximate position with respect to electrode 774, controller 736 once again generates control signals causing switch 778 that result in cessation, or substantial reduction, of the application of electric or magnetic field by electrodes 772 and 774 as shown in FIGS. 14H and 14I. As a result, the momentum of members 732 carries pole portion 770 past a most proximate position with electrode 774. Once pole portion 770 has rotated past the most proximate position with respect to the electrode 774, controller 736 generates control signals causing switch 778 to transmit charge to electrode 772 and 774 such that electrodes 772 and 774 apply an electric or magnetic field to members 732 so as to continue to rotate members 732 to move pole portion 770 towards electrode 772 as once again shown in FIGS. 14B and 14C. Thereafter, the process continues or cycles through the positions shown and described with respect to FIGS. 14B-14I to continue to rotate members 732 between different light interaction states during operation.

In the particular example illustrated, members 732 continue to between a first greater reflective state and a second lesser reflective state during operation. Because each of members 732 has ongoing rotation during operation between the differing light interaction states, such as the different reflectivity states, members 732 may more easily be switched between the differing states at a potentially faster rate and with potentially less energy.

FIG. 15 schematically illustrates display system 820, another embodiment of display system 520. Display system 820 is substantially similar to display system 520 except that display system 820 includes screen 822 in lieu of screen 522. For ease of illustration, those remaining components of display system 820 are not shown in FIG. 15. Screen 822 is similar to screen 722 except that screen 822 includes support 830 and members 832 in lieu of support 730 and members 732, respectively. Support 830 is similar to support 730 except that support 830 includes segments 840 and 842 in lieu of segments 740 and 742, respectively. Like segment 740, segment 840 is formed from a light absorbing or opaque material. In other embodiments, segment 840 may be formed from a translucent material and provide with a light absorbing or opaque backing or may be formed from a translucent material.

Like segment 742, segment 842 is formed from a transparent or translucent material so as to permit light to pass through segment 842 and to interact with members 832. Segment 842 cooperates with segment 840 to form cavities 844. Cavities 844 are configured such that each of cavities 844 are in communication with one another and such that intermediate faces 748 are omitted. As a result, members 832 may be positioned in closer proximity to one another, increasing contrast by reducing aperture ratios.

Members 832 are similar to members 732 except that members 832 include portions 760 and 762 which do not equally extend about axes 764. In the particular example illustrated, lesser reflective portion 762 extends about axis 764 to a greater extent as compared to greater reflective portion 762. As a result, during continuous rotation of members 832, portions 762 will be exposed and impinged upon by light passing through segment 842 a greater percentage of time as compared to the time during which light passing through segment 842 impinges upon portions 760. Because members 832 are in the lesser reflective state for a longer period of time, ambient light sources 526A-526G are also in their greater bright state for a longer period of time. Conversely, because members 832 are in the greater reflective state for a lesser period of time, less light projected from projector 524 may be reflected off of screen 822.

In the particular example illustrated, portion 762 extends approximately 270° about axis 764 while portion 762 extends approximately 90° about axis 764. In other embodiments, portions 760 and 762 may extend about axes 764 with other relative proportions. For example, in some embodiments, portions 762 may extend about axis 764 by greater than 180 degrees but less than 270 degrees or by more than 270 degrees. In still other embodiments where it may be desired that ambient light sources 526A-526G be in their greater bright state for shorter periods of time, portions 762 may extend about axes 764 by less than 180 degrees while portions 760 extend about axes 764 by greater than 180 degrees.

FIG. 16 schematically illustrates display system 920, another embodiment of display system 520 (shown and described with respect to FIG. 7). Display system 920 is similar to display system 520 except that display system 920 includes screen 922 in lieu of screen 522. For ease of illustration, those remaining components of display system 920 are not shown in FIG. 16, but are shown in FIG. 7. Screen 922 includes support 930, members 932, actuator 934 and controller 736. Support 930 constitutes a structure configured to rotatably support and at least partially enclose members 932. Support 930 includes wells 946 and intermediate faces 948. Wells 946 receive and capture members 932 and facilitate rotation of members 932. In the particular example illustrated, wells 946 extend about each of members 932 by greater than 180 degrees so as to capture and retain members 932 within wells 946. Wells 946 each having the opening or window 950 through which a portion of each member 932 is exposed for interaction with light. Because support 930 captures each member 932 without well 946, additional structures such as segments 742 (shown in FIG. 12) may be omitted.

Intermediate faces 948 extend between wells 946 and define windows 950. In the particular example illustrated, intermediate faces 948 are configured to attenuate or absorb light impinging screen 922 between members 932. In one embodiment, intermediate faces 948 may have a light absorbing or attenuating layer coated or otherwise applied upon support 930. In yet other embodiments, support 930 itself may be formed from one or more light absorbing or attenuating materials. In one embodiment, face 940 is provided with a black color so as to substantially absorb light. In other embodiments, face 948 may have other reflectivities.

Members 932 are similar to members 732 except that members 932 each include multiple portions 760 and multiple portions 762 extending about axis 764. In one embodiment, each of portions 760 interact with light in a first fashion while each of portions 762 interact with light in a second fashion distinct from the first fashion. For example, in one embodiment, each of portions 760 has a first reflectivity while each of portions 762 has a second reflectivity. In other embodiments, portions 760 themselves may have distinct light interacting characteristics such as distinct reflectivities. In some embodiments, each of portions 762 may have light interaction characteristics such as reflectivities which are distinct from one another. Because members 732 include multiple portions 760 and multiple portions 762, members 762 actuate between different light interaction states or different reflectivity states a greater number of times during a single revolution of each member 932. Members 932 may be actuated between the different states at a higher frequency as compared to members 732 (shown in FIG. 12) while being rotated at the same speed.

In the particular embodiment illustrated, each of members 932 includes a pair of oppositely arranged portions 760 and a pair of oppositely arranged portions 762. In such an embodiment, each of portions 760 extends approximately 90 degrees about axis 764 while each of portions 762 also extends about axis 764 by about 90 degrees. In other embodiments, portions 760 may extend about axis 764 by a larger extent while portions 762 extend about axis 764 by a lesser extent. In yet other embodiments, portions 762 may extend about axis 764 by a larger extent while portions 760 extend about axis 764 by a lesser extent. In lieu of each member 932 including a pair of opposite portions 760 and a pair of opposite portions 762, each member 932 may alternatively include a greater number of such portions 760 and a greater number of such portions 762.

Actuator 934 is configured to rotatably drive members 932 between a first position in which portion 960 is exposed through window 950 and a second position in which portion 962 is exposed through window 950. Actuator 934 includes electrodes 972, electrodes 974, voltage source 776 and switch 778. Electrodes 972 and 974 extend between consecutive members 932 and configured to apply an electric field to members 932 so as to attract and/or repel pole portion 770 of members 932 to facilitate the rotation of members 932. In the particular example illustrated, electrodes 972 are configured to apply an electric or magnetic field to adjacent members 932. Likewise, electrodes 974 are also configured to apply an electric field or magnetic field to adjacent members 932. In the particular example illustrated, electrodes 972 and 974 are embedded within support 930. In other embodiments, electrodes 972 and 974 may be coupled to support 930 proximate to consecutive members 932 in other fashions.

Voltage source 776, switch 778 and controller 736 are described above with respect to FIG. 12. In the example shown in FIG. 16, controller 736 generates control signals causing switch 778 to supply charge to electrodes 972 and 974 so as to apply electric or magnetic fields to members 932 so as to rotatably drive members 932 to selectively position portions 760 and 762 across windows 950. In one embodiment, controller 736 may be configured to generate control signals to continue to rotate members 932 during operation such that portions 760 and 762 are alternatively positioned across windows 950 at a frequency corresponding to the frequency at which one or more of ambient light sources 526A-526G (shown in FIG. 7) are flickered between a first bright state and a second lesser bright state. Controller 736 continues to rotates members 932 during operation such that members 932 rotate in unison and in synchronization with one another and such that portions 760 of members 932 extend across windows 950 while ambient light sources 526A-526G are in the second lesser bright state and such that portions 762 are exposed across windows 950 while ambient light sources 526A-526G are in the first greater bright state.

FIG. 17 schematically illustrates display system 980, another embodiment of display system 520. Display system 980 is similar to display system 920 (shown on FIG. 16) except the display system 980 includes screen 982 in lieu of screen 922. For ease of illustration, those remaining components of display system 980 are not shown in FIG. 17, but are shown in FIG. 7. Screen 982 is similar to screen 922 except that screen 982 includes light interaction members 984. Light interaction members 984 are similar to light interaction members 932 except that light interaction members 984 have central portions or cores 986 which are substantially transparent and omit one of portions 760 and one of portions 762. Because cores 986 of each of members 982 are substantially transparent, light may interact with portions 760 and 762 on both sides or faces of such portions. For example, in the position illustrated in FIG. 17, light may past through cores 986 and interact with a backside of portion 760. In one embodiment, such light may pass through cores 986 and reflect from a backside of portions 760. Rotation of members 984 180 degrees will result in portion 760 being positioned across window 950 and light reflecting off a front or top side of portion 760.

In a similar manner, the substantial transparency of cores 986 enables light to interact with both faces of portions 762. For example, rotation of each of members 984 90 degrees in a clockwise direction (as seen in FIG. 17) will result in portions 762 to be positioned across windows 950 such that light may pass through windows 950, pass through cores 986 and interact with a backside of each of portions 762. In one embodiment, such light is attenuated or absorbed by portions 762. Rotation of each of members 984 an additional 180 degrees will result in portions 762 being positioned across windows 950 such that light may interact with a front or top face of portions 762.

Although FIG. 17 illustrates members 984 as omitting one of portions 760 and one of portions 762, in other embodiments, members 984 may alternatively omit one of portions 760 or one of portions 762. Although members 984 illustrated as including one portion 760 and one portion 762, in other embodiments, members 984 may include a greater number of portion 760 or a greater number of portion 762 with opposite (180 degrees offset) portions enabling light to pass through core 986 and to interact with a backside of such provided portions. Although portion 760 and portion 762 have been described as being configured so as to interact with light in the same fashion regardless of whether the light impinges a front side or the back side of such portions, in other embodiments, portions 760 and 762 each may alternatively be configured to interact with light differently on the front side as compared to the opposite backside of such portions.

Figure 18:
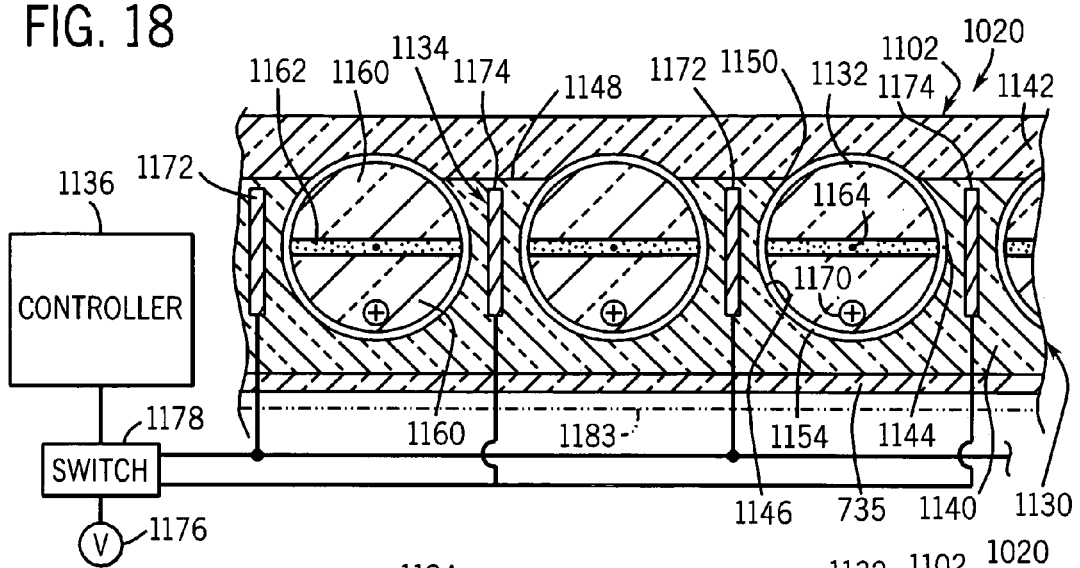
FIG. 18 is an enlarged fragmentary sectional view of another embodiment of a light modulator of the display system of FIG. 7 illustrating light interaction members in a first position according to an example embodiment.

FIG. 18 schematically illustrates display system 1020, another embodiment of display system 520. Display system 1020 is similar to display system 520 (shown in FIG. 7) except that display system 1020 includes a light interaction system comprising a light modulator 1102 in lieu of light modulator 602. For ease of illustration, those remaining components of display system 1020 are not shown in FIG. 18, but are shown in FIG. 7. Light modulator 1102 constitutes a light interaction system configured to selectively shutter, block or attenuate the transmission of light. Although light modulator 1102 is illustrated as being utilized in display system 1020, light modulator 1102 may be used in other applications.

Light modulator 1102 generally includes support 1130, light interaction members 1132, actuator 1134 and controller 1136. Support 1130 constitutes one or more structures configured to movably support members 1134 for rotation about rotational axes 1164. In the particular example illustrated, support 1130 includes segments 1140 and 1142. Segment 1140 is substantially similar to segment 740 (shown and described with respect to FIG. 12) except that segment 1140 is formed from one or more transparent dielectric materials. In one embodiment, segment 1140 may be formed from material such as glass, and the like. Segment 1142 is substantially similar to segment 742 (shown and described with respect to FIG. 12). Segment 1142 cooperates with segment 1140 to form spherical cavities 1144 which receive members 1132. In one embodiment, cavities 1144 are at least partially filled with a transparent or translucent lubricating fluid or other material 1154. In other embodiments, lubricating fluid 1154 may be omitted.

In the particular embodiment illustrated, segment 1440 includes wells 1146 and intermediate faces 1148. Wells 1146 constitute an spherical cavities or depressions which partially receive members 1132 and form windows 1150. Intermediate faces 1148 extend between adjacent wells 1146 and define windows 1148. Intermediate faces 1448 are formed by a layer of light attenuating, light blocking or light reflecting material. Intermediate faces 1148 prevent or reduce the passage of light through modulator 1102 between members 1132.

Members 1132 constitute spherical members rotatably captured within cavities 1144. Each member 1132 includes translucent or transparent portions 1160 and a light attenuating, light absorbing, light blocking or light reflecting portion 1162. Portion 1162 extends across its respective member 1132 and intersects axis 1164. In one particular embodiment, each portion 462 constitutes an elongate plate or layer of material extending across each of members 1132. Although portions 1162 are illustrated as linearly extending across each of members 1132, portions 1162 may alternatively have other cross sectional shapes through or across each of members 1132.

Actuator 1134 is similar to actuator 734 shown and described with respect to FIG. 12. Actuator 1134 include poles 1170, electrode 1172, electrode 1174, voltage source 1176 and switch 1178. Poles 1170 constitute structures or materials coupled to each of members 1132 and retaining a charge or magnetic pole to facilitate rotation of each of members 1132 in response to an appropriate applied electric or magnetic field.

Electrode 1172 constitutes multiple layers or a single continuous layer of transparent electrically conductive material coupled to support or segment 1140 of support 1130 in sufficient proximity to members 1132 so as to apply an electric or magnetic field to members 1132. Electrode 1174 constitutes one or more layers of transparent electrically conductive material coupled to segment 1142 generally opposite to electrode 1172. Electrode 1174 is arranged sufficiently close to members 1132 so as to apply an electric or magnetic field to members 1132. In one embodiment, electrodes 1172 and 1174 constitute a transparent electrically conductive material such as indium tin oxide. In other embodiments, electrodes 1172 and 1174 may constitute other transparent electrically conductive materials. In yet other embodiments where electrodes 1172 and 1174 are arranged at locations so as not to interfere with the passage of light through members 1132, electrodes 1172 and 1174 may be formed from non-transparent electrically conductive materials.

Switch 1178 selectively conducts electrical current to electrodes 1172 and 1174 in response to control signals from controller 1136. In one embodiment, switch 1178 may constitute a mechanically actuated switch such as switch actuated by a solenoid or the like. In yet another embodiment, switch 1178 constitute a semiconductive switching device such as one or more thin film transistors or one or more metal-insulator-metal switching devices.

Figure 19:
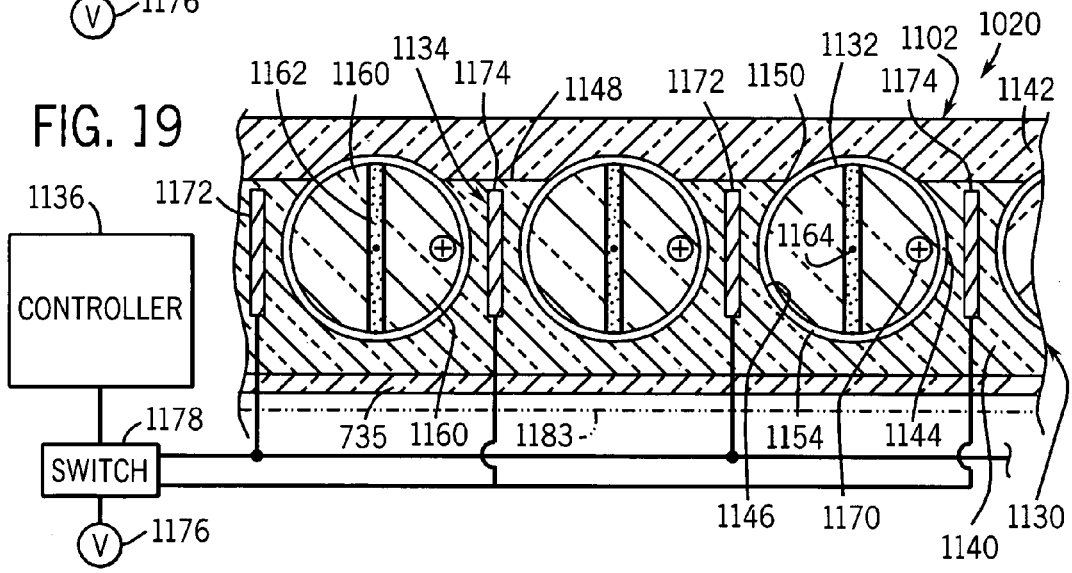
FIG. 19 is an enlarged fragmentary sectional view of the light modulator of FIG. 18 illustrating the light interaction members in a second position according to an example embodiment.

Controller 1136 is similar to controller 736 shown and described with respect to FIG. 12. In the embodiment shown in FIG. 18, controller 1136 generates control signals directing switch 1178 to selectively charge electrodes 1172 and 1174 so as to apply an electric field to poles 1170 of members 1132 to rotatably drive members 1132 between a first position shown in FIG. 18 in which portions 1162 extend across windows 1150 and a second position shown in FIG. 19 in which members 1132 are rotated such that portions 1162 extend perpendicular to intermediate faces 1148 to permit the passage of light through windows 1150 and through light transmissive portions 1160 of members 1132. In one embodiment, controller 1136 generates control signals such that members 1132 rotate between the first position shown in FIG. 18 and the second position shown in FIG. 19 at a frequency greater than a flicker fusion frequency of a human eye. In one embodiment, controller 1136 generates control signals such that members 1132 rotate between the first and second positions in substantial synchronization with screen 522 (shown in FIG. 7). According to one embodiment, portion 1162 extends across window 1150 while screen 522 is in a greater reflective state and in which portions 1116 and 1162 are perpendicular to windows 1150 to transmit light through transmissive portions 1160 while screen 522 is in a lesser reflective state.

In other embodiments, light modulator 1102 may have other configurations. For example, in other embodiments, in lieu of members 1132 comprising spheres arranged in a honeycomb pattern as shown in FIG. 11, members 1132 may constitute rods or cylinders and may be mechanically driven as set forth in FIGS. 20 and 21 hereafter. In yet other embodiments, electrodes 1174 may alternatively be arranged opposite to electrode 1172 and controller 1136 may be configured to continue to rotate members 1132 during operation. In yet other embodiments, segment 1140 may additionally include a reflective layer 1183 (shown in broken lines), enabling modulator 1102 shown in FIG. 18 to alternatively be utilized in lieu of screen 522. In still other embodiments, modulator 1102 may additionally include a layer 1183 configured to absorb or attenuate light while portion 1162 is configured to reflect light such that modulator 1102 may be utilized as a screen that may be modulated between a greater reflective state in FIG. 18 and a less reflective state in FIG. 19.

Figure 20:
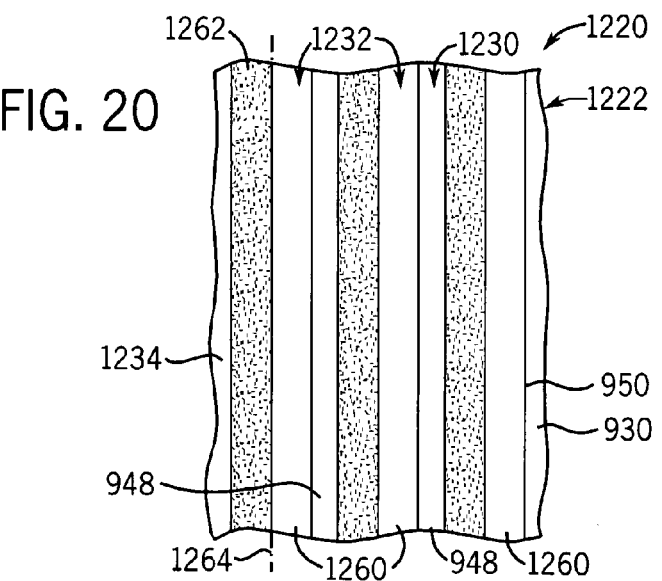
FIG. 20 is an enlarged fragmentary top plan view of another embodiment of a screen of the display system of FIG. 7 according to an example embodiment.
Figure 21:
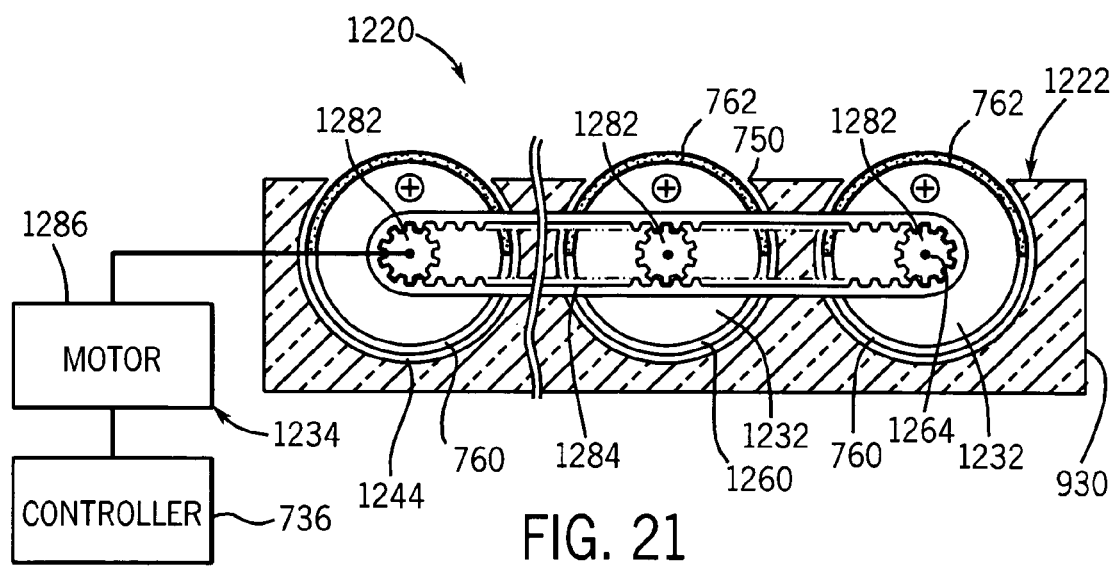
FIG. 21 is an enlarged fragmentary sectional view of the screen of FIG. 20 according to an example embodiment.
Figure 22:
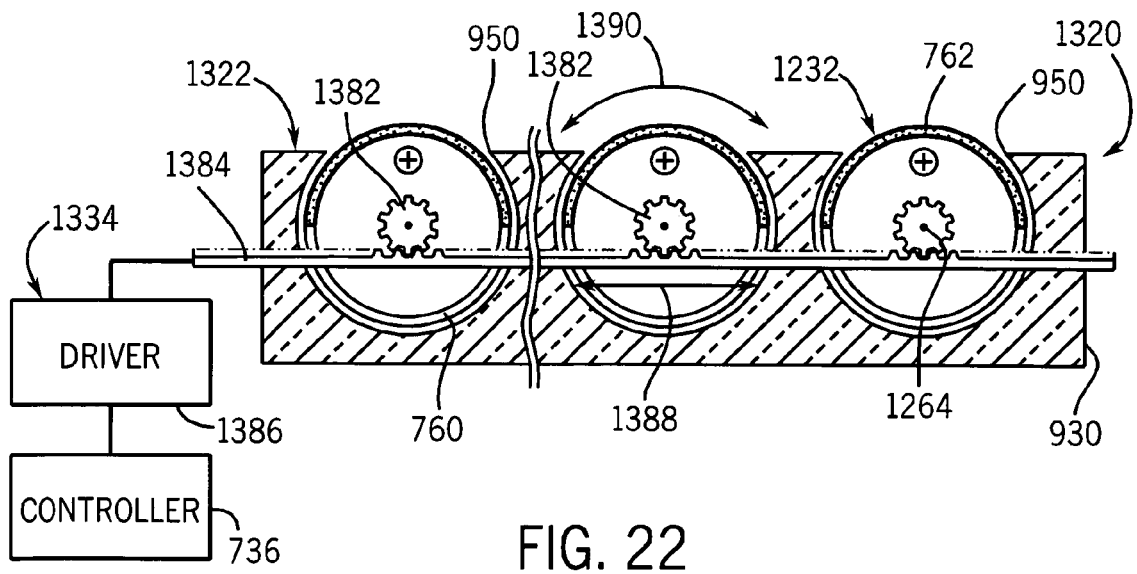
FIG. 22 is an enlarged fragmentary sectional view of another embodiment of the screen of FIG. 20 according to an example embodiment.

FIGS. 20-22 schematically illustrate display system 1220, another embodiment of display system 520 (shown in FIG. 7). Display system 1220 is similar to display system 520 except that display system 1220 includes screen 1222 in lieu of screen 522. For ease of illustration, the remaining components of display system 1220 which correspond to those components of display system 520 are not shown in FIG. 20, but are shown in FIG. 7. Screen 1222 is similar to screen 722 (shown in FIG. 12) except that screen 1222 includes support 930 (shown and described with respect to FIG. 16) in lieu of support 730, includes members 1232 in lieu of members 732 and includes actuator 1234 in lieu of actuator 934. In other embodiments, screen 1222 may alternatively include support 730 (shown and described with respect to FIG. 12). And still other embodiments, Screen 1220 may include a support similar to support 730 except that segments 740 and 742 of support 730 are integrally formed as a singular unitary body, wherein members 1232 are actually moved into cavity 746 (shown and described with respect to FIG. 12).

Members 1232 are similar to members 732 except that members 1232 constitute cylinders or rods rather than balls or spheres. As shown by FIG. 20, light interaction members 1232 constitute elongate cylinders extending along a face of screen 1222. In the particular example illustrated, members 1232 extend along axes 1264 which are parallel to one another and which are in a substantially vertical orientation when utilized as part of display system 1222. Because members 1232 are arranged in a substantially vertical orientation and project beyond a surface of support 930, light from projector 524 (shown in FIG. 7) as projected off of screen 1222 provides a viewer with a wider horizontal viewing cone. As a result, less ambient light from overhead ambient light sources is reflected off of member 1232 of screen 1222. In addition, image quality may be better for those observers viewing screen 1222 at an angle from either the left or right side of screen 1222. In other embodiments, member 1232 may alternatively extend along axes 1264 which are horizontal, which are diagonal or which have other orientations.

Like members 732, members 1232 include a first outer light interactive portion 760 and a second distinct outer light interaction portion 762. For ease of illustration, each of members 1232 is illustrated in a position in which both portions 760 and 762 are temporarily exposed across window 750 as members 1232 are being rotated by an actuator such as actuator 734 (shown in FIG. 12). Rather than being contained within spherical cavity 744, members 1234 are captured or contained within cylindrical cavities 1244. Similar to screen 722, screen 1222 includes actuator 734 and controller 736 (shown and described with respect to FIG. 12).

Actuator 1234 includes drive coupling members 1282, endless member 1284, and motor 1286. Drive coupling members 1282 constitute structures coupled to each of members 1232 to couple each of members 1232 to endless member 1284. In one embodiment, drive coupling members 1282 project from members 1232 along axes 1264.

Endless member 1284 constitutes an endless member extending or wrapped about drive couplers 1282 of end most members 1232 and in engagement with intermediate drive couplers 1282. In other embodiments, endless member 1284 may extend or wrap about other end most rotatable structures while engaging opposite sides of drive couplers 1282. Endless member 1284 connects each of drive couplers 1282 and their associated members 1232 to facilitate synchronous rotation of members 1232. In one embodiment, drive couplers 1282 may constitute toothed gears or pinions while endless member 1284 may constitute a toothed belt. In other embodiments, drive couplers 1282 may constitute sprockets while endless member 1284 constitutes an elongate chain. In yet other embodiments, drive couplers 1282 may constitute gears which are interconnected to one another by intermediate gears in lieu of endless member 1284.

Motor 1286 constitutes a motor configured to supply torque to drive endless member 1284 so as to continue to rotate members 1232 during operation in synchronization with one another between states in which portions 1260 and 1262 are alternately positioned across window 750. Motor 1286 drives endless member 1284 in response to control signals from controller 1236. Controller 736 generates control signals to synchronize the rotation of members 1232 with the flickering of ambient light sources 526A-526G between the different bright states as described above.

FIG. 22 schematically illustrates display system 1320, another embodiment of display system 520 (shown in FIG. 7). Display system 1320 is similar to display system 520 except that display system 1320 includes screen 1322 in lieu of screen 522. For ease of illustration, those remaining components of display system 1320 which correspond to those components of display system 520 are not shown in FIG. 22, but are shown in FIG. 7. Screen 1322 is similar to screen 1222 (shown in FIG. 21) except that screen 1322 includes actuator 1234 in lieu of actuator 1234. Actuator 1334 includes pinion gears 1382, rack gear 1384 and driver 1386. Pinion gears 1382 are coupled to members 1232 and axially extend from members 1232 along axes 1264. Rack gear 1384 extends along an axial end of screen 1322 and is in meshing engagement with pinion gears 1382.

Driver 1386 constitutes a mechanism configured to reciprocate rack gear 1384 back and forth in the directions indicated by arrows 1388 to rotatably drive members 1232 back and forth in the directions indicated by arrows 1390. Driver 1386 reciprocates rack gear 1384 a sufficient distance such that each of members 1232 is rotated about its axes 1264 to a degree sufficient so as to alternately position portions 760 and 762 across windows 950.

In one embodiment, driver 1386 may constitute one or more electric solenoids. In other embodiments, actuator 1386 may constitute one or more hydraulic or pneumatic cylinder-piston assemblies. In yet other embodiments, driver 1386 may constitute a motor and an appropriate arrangement of cams arrangement to facilitate reciprocal movement or to linearly actuate rack gear 1384. Driver 1386 actuates rack gear 1384 in response to control signals from controller 1236.

Controller 736 is described above with respect to FIG. 12. In the embodiment shown in FIG. 22, controller 736 is configured to generate control signals such that actuator 1334 rotates members 1232 and such that portions 760 and 762 are alternately positioned across windows 950 at a frequency corresponding to the frequency at which ambient light sources 526A-526G (shown in FIG. 7) flicker between the first bright state and the second lesser bright state. Controller 736 is configured to rotate members 1232 such that portions 760 extend across windows 950 while ambient light sources 526A-526G are in the second lesser bright state and is configured to rotate members 732 such that portions 762 extend across windows 950 while ambient light sources 526A-526G are in the first greater bright state.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A system comprising:
    members having a first light interaction state and a second light interaction state, wherein the members constitute rods extending along vertical axes or spheres arranged in a honeycomb pattern; and
    an actuator configured to continuously, during operation of the system, move the members between the first light interaction state and the second light interaction state, wherein the actuator is configured to continuously rotate the members between the first interaction state and the second interaction state at a frequency of at least 50 Hertz during operation.

2. The system of claim 1, further comprising a screen, for use with a light source for providing light that changes between a first state having a first intensity and a second state having a second intensity less than the first intensity that includes the members and wherein the actuator is configured to position the members in the first light interaction state comprising a first reflective state with the light source in the second state and to position the members in the second light interaction state comprising a second reflective state of less reflectivity than the first reflective state with the light source in the first state.

3. The system of claim 2, wherein the actuator is configured to continuously rotate the members, during operation of the screen, such that the light source is in the second lesser bright state while the members are transitioning between the second reflective state and the first reflective state.

4. The system of claim 1, wherein the members are electrically and optically anisotropic.

5. The system of claim 1, further comprising a light source for providing light that changes between a first state having a first intensity and a second state having a second intensity less than the first intensity at a frequency, wherein the actuator is configured to change the members between the first light interaction state and the second light interaction state at the same frequency.

6. The system of claim 1, wherein the actuator is configured to continuously rotate the members during operation of the system in substantial synchronization with one another.

7. The system of claim 1, wherein the actuator includes an endless member coupled to the members to rotatably drive the members.

8. The system of claim 1, wherein the members are electrically anisotropic and wherein the actuator is configured to selectively emit a field to rotatably drive the members.

9. The system of claim 1, wherein the members are magnetically anisotropic and therein the actuator is configured to selectively emit a magnetic field to rotatably drive the members.

10. The system of claim 1, wherein each member includes a light transmissive portion and a light attenuating portion.

11. An apparatus comprising:
    members having a first light transmissive state and a second light transmissive state, less transmissive than the first light transmissive state; and
    an actuator configured to rotate the members between the first light transmissive state and the second light transmissive state, wherein the members are configured such that light passes through the members into a first side of the members and out a second side of the members when the members are in the first light transmissive state and wherein the actuator is configured to continuously rotate the members during operation of the apparatus.

12. The apparatus of claim 11, wherein the actuator is configured, during operation of the apparatus, to continuously rotate the members in unison with one another between the first state and the second state.

13. The apparatus of claim 11, wherein the actuator includes an endless member coupled to the members to rotatably drive the members.

14. The apparatus of claim 11, wherein the actuator is configured to continuously rotate the members between the first light transmissive state and the second light transmissive state during operation of the apparatus at a frequency of at least 50 Hertz.

15. An apparatus comprising:
members having a first light interaction state and a second light interaction state, wherein the members constitute rods extending along vertical axes or spheres arranged in a honeycomb pattern; and
means for continuously rotating the members, during operation of the apparatus, between the first light interaction state and the second light interaction state at a frequency of at least 50 Hertz.

16. A method comprising:
providing members having a first light interaction state and a second light interaction state;
continuously rotating the members 360 degrees between the first state and the second state for a period of time, wherein the members are continuously rotated at a speed so as to actuate the members between the first light interaction and the second light interaction state at a frequency of at least 50 Hertz; and
sensing a position of at least one of the members to synchronize with an external device using an inductive sensor in which electrical current is induced by rotation of the members.

17. The method of claim 16, wherein the members are continuously rotated in unison with one another between the first interaction state and the second interaction state.

18. The method of claim 17, wherein the members are part of a projection screen and wherein all of the members of the projection screen are rotated in unison to the first light interaction state and wherein all of the members are rotated in unison to the second light interaction state.

19. The method of claim 16, wherein the first light interaction state is a first reflective state, wherein the second light interaction state is a second lesser reflective state and wherein the method further constitutes changing a light between a first bright state and a second lesser bright state such that the light source is in the first bright state while at least one of the members is in the first reflective state.

20. The method of claim 16, wherein the members are electrically or magnetically anisotropic and wherein the method further constitutes applying a field to the members to continuously rotate the members.

21. The method of claim 16, wherein rotation of the members is such that the members are in the first light interaction state with a light source at a first intensity and are in the second light interaction state with the light source at a second distinct intensity.

22. A system comprising:
members having a first light interaction state and a second light interaction state; and
an actuator configured to continuously, during operation of the system, move the members between the first light interaction state and the second light interaction state wherein the actuator includes an endless member coupled to the members to rotatably drive the members and wherein the members include at least three members and wherein each member rotates about a different axis.

23. A system comprising:
members having a first light interaction state and a second light interaction state; and
an actuator configured to continuously, during operation of the system, move the members between the first light interaction state and the second light interaction state wherein the actuator includes an endless member coupled to the members to rotatably drive the members and wherein each member has a first circumferential surface about an axis providing the first light interaction state and a second circumferential surface about the axis providing the second light interaction state.

24. A system comprising:
members having a first light interaction state and a second light interaction state;
a black well containing the members; and
an actuator configured to continuously, during operation of the system, rotate the members between the first light interaction state and the second light interaction state at a frequency of at least 50 Hertz.

25. The system of claim 24, wherein the actuator includes an endless member coupled to the members to rotatably drive the members.

* * * * *

UNITED STATES PATENT AND TRADEMARK OFFICE
CERTIFICATE OF CORRECTION

PATENT NO. : 7,614,750 B2  Page 1 of 1
APPLICATION NO. : 11/210391
DATED : November 10, 2009
INVENTOR(S) : Gregory J. May et al.

It is certified that error appears in the above-identified patent and that said Letters Patent is hereby corrected as shown below:

On the Title Pg Item (75), Inventors, line 1, delete "Gregory H. May" and insert -- Gregory J. May --, therefor.

Signed and Sealed this

Ninth Day of February, 2010

David J. Kappos
*Director of the United States Patent and Trademark Office*